(12) United States Patent
Fukuda et al.

(10) Patent No.: US 11,835,970 B2
(45) Date of Patent: Dec. 5, 2023

(54) UNMANNED AERIAL VEHICLE WITH WORK IMPLEMENT VIEW AND OVERVIEW MODE FOR INDUSTRIAL VEHICLES

(71) Applicant: KOBELCO CONSTRUCTION MACHINERY CO., LTD., Hiroshima (JP)

(72) Inventors: Tomohiro Fukuda, Hiroshima (JP); Akihiko Eita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 78 days.

(21) Appl. No.: 17/448,719

(22) Filed: Sep. 24, 2021

(65) Prior Publication Data
US 2022/0100212 A1  Mar. 31, 2022

(30) Foreign Application Priority Data
Sep. 30, 2020 (JP) ................................. 2020-165395

(51) Int. Cl.
| | | |
|---|---|---|
| *G05D 1/10* | (2006.01) | |
| *B64C 39/02* | (2023.01) | |
| *B64D 47/08* | (2006.01) | |
| *E02F 9/26* | (2006.01) | |
| *B64U 10/13* | (2023.01) | |

(Continued)

(52) U.S. Cl.
CPC ......... *G05D 1/1064* (2019.05); *B64C 39/024* (2013.01); *B64D 47/08* (2013.01);
(Continued)

(58) Field of Classification Search
CPC ................................ G05D 1/106; B64U 10/13
See application file for complete search history.

(56) References Cited

U.S. PATENT DOCUMENTS 9,170,117 B1 * 10/2015 Abuelsaad ........... G05D 1/0011
2017/0175363 A1 * 6/2017 Clarke ................. G05D 1/0094
(Continued)

FOREIGN PATENT DOCUMENTS

EP      3 150 037 A1    4/2017
GB      2533140 A   *  6/2016    ........... A01B 69/008
(Continued)

OTHER PUBLICATIONS

Extended European Search Report dated Feb. 25, 2022 in European Patent Application No. 21198161.8, 9 pages.

*Primary Examiner* — Hussein Elchanti
*Assistant Examiner* — Kenneth M Dunne
(74) *Attorney, Agent, or Firm* — Oblon, McClelland, Maier & Neustadt, L.L.P.

(57) ABSTRACT

Provided is a work support apparatus for a work machine including a lower traveling body, an upper turning body mounted on the lower traveling body, and a work device attached to the upper turning body. The work support apparatus, which provides a captured image for supporting work by the work machine, includes a flying object capable of flying over the air, an image capture device, a flight mode designation unit, and a flight control unit. The image capture device is mounted on the flying object and acquires the captured image. The flight mode designation unit designates a specific flight mode from among a plurality of flight modes set in advance for the flight action of the flying object. The flight control unit performs a flight control for making the flying object make a flight action corresponding to the flight mode designated by the flight mode designation unit.

7 Claims, 13 Drawing Sheets

(51) Int. Cl.
  *G08G 5/00* (2006.01)
  *G08G 5/04* (2006.01)
  *E02F 9/22* (2006.01)
  *B64U 101/30* (2023.01)

(52) U.S. Cl.
  CPC .......... *E02F 9/261* (2013.01); *G08G 5/0039* (2013.01); *G08G 5/0069* (2013.01); *G08G 5/045* (2013.01); *B64U 10/13* (2023.01); *B64U 2101/30* (2023.01); *B64U 2201/20* (2023.01); *E02F 9/2228* (2013.01); *E02F 9/2285* (2013.01); *E02F 9/2292* (2013.01)

(56) References Cited

U.S. PATENT DOCUMENTS

| | | | | |
|---|---|---|---|---|
| 2017/0329304 | A1* | 11/2017 | Aremu | G05D 1/00 |
| 2018/0196438 | A1* | 7/2018 | Newlin | B64D 47/08 |
| 2018/0239849 | A1* | 8/2018 | Martinsson | E02F 3/40 |
| 2018/0308275 | A1* | 10/2018 | Fortmann | G06V 20/56 |
| 2018/0371723 | A1* | 12/2018 | Nishi | B64C 39/024 |
| 2019/0016569 | A1* | 1/2019 | Palberg | B64C 39/024 |
| 2019/0028676 | A1* | 1/2019 | Koga | G08B 25/10 |
| 2019/0093320 | A1* | 3/2019 | Forcash | G06V 10/751 |
| 2020/0018045 | A1* | 1/2020 | Sano | E02F 3/32 |
| 2020/0363203 | A1* | 11/2020 | Plouzek | H04N 7/183 |
| 2020/0370282 | A1 | 11/2020 | Nishi et al. | |
| 2020/0393303 | A1* | 12/2020 | Betournay | G01J 5/046 |
| 2022/0194580 | A1* | 6/2022 | Cowgill | B64C 39/024 |

FOREIGN PATENT DOCUMENTS

| | | |
|---|---|---|
| GB | 2533140 A | 6/2016 |
| JP | 2016-181119 A | 10/2016 |
| WO | WO 2017/131194 A1 | 8/2017 |

* cited by examiner

UNMANNED AERIAL VEHICLE WITH WORK IMPLEMENT VIEW AND OVERVIEW MODE FOR INDUSTRIAL VEHICLES

TECHNICAL FIELD

The present invention relates to a work support apparatus for a work machine.

BACKGROUND ART

When an image capture device for work support is mounted on an upper turning body of a work machine such as an excavator, there remains a space in which the image capture device cannot pick up an image. In order to image such a remaining space, WO2017/131194 publication discloses a technique of mounting an image capture device on a flying object.

However, the prior art described above does not necessarily provide an image useful to the operator. Specifically, the target flight position of the flying object according to the prior art is set for the purpose of eliminating the blind spot of an operator (i.e., for simple peripheral monitoring), not being determined from the viewpoint of providing a viewing angle for the operator's work support.

SUMMARY OF INVENTION

An object of the present invention is to provide a work support apparatus capable of providing an image to an operator who uses a work machine, the image being useful for the operator.

Provided is a work support apparatus for a work machine. The work machine includes a lower traveling body, an upper turning body mounted on the lower traveling body, and a work device attached to the upper turning body to make a working motion. The work support apparatus, which provides a captured image for supporting work to be performed by the work machine, includes a flying object, an image capture device, a flight mode designation unit, and a flight control unit. The flying object is capable of flying over the air. The image capture device is mounted on the flying object and acquires the captured image. The flight mode designation unit designates a specific flight mode from among a plurality of flight modes set in advance for a flight action of the flying object. The flight control unit performs a flight control of making the flying object make a flight action corresponding to the flight mode designated by the flight mode designation unit. The plurality of flight modes include a first flight mode for allowing the image capture device to acquire a peripheral monitoring image for monitoring the periphery of the work machine as the captured image, and a second flight mode for allowing the image capture device to acquire a work support image for supporting work to be performed by the work device as the captured image.

DESCRIPTION OF EMBODIMENTS

Hereinafter will be described a preferred embodiment of the present invention in detail with reference to the attached drawings.

Figure 1:
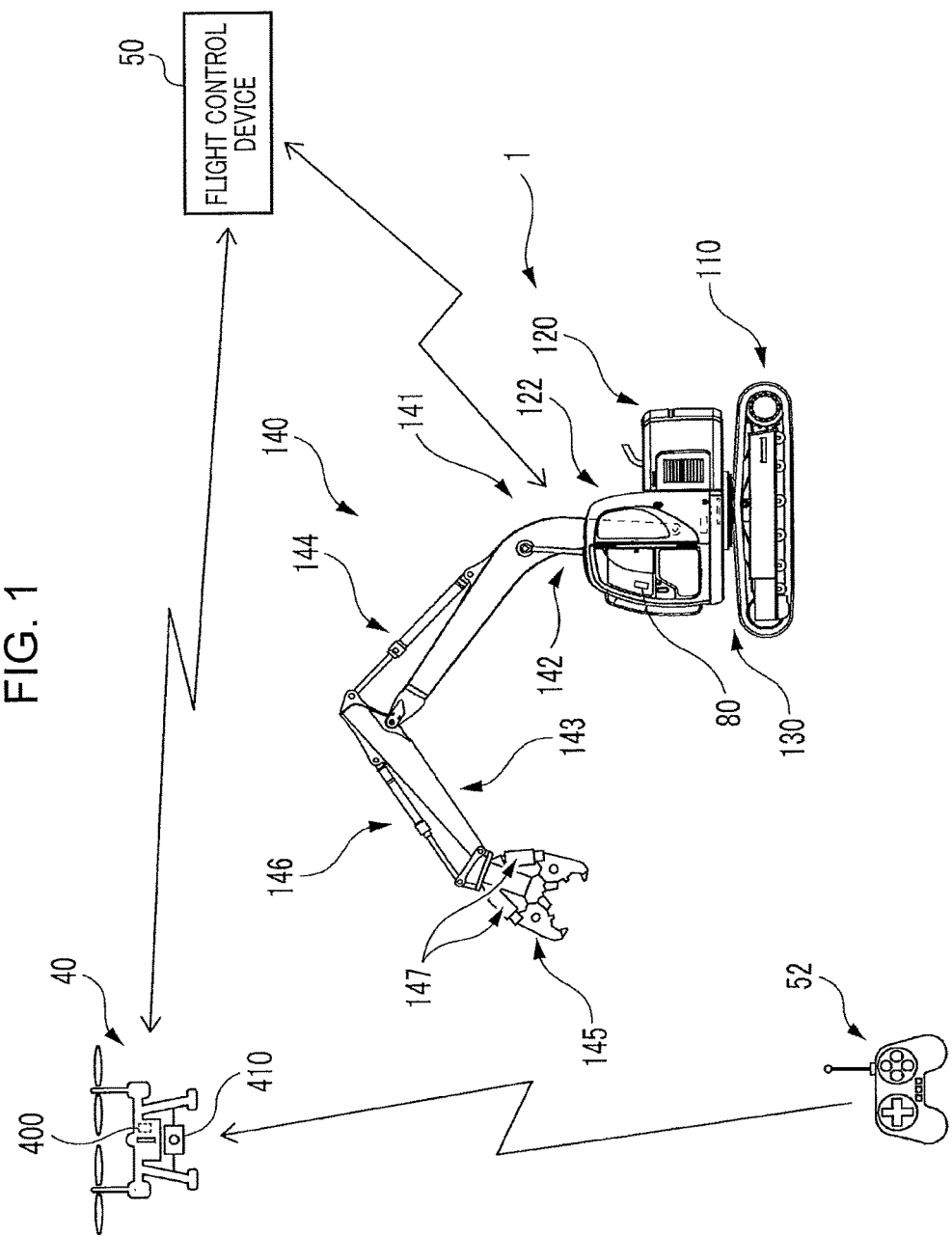
FIG. 1 is a diagram showing a work machine and a work support apparatus for the work machine according to an embodiment of the present invention.

FIG. 1 shows a work machine 1 according to an embodiment of the present invention and ancillary equipment for supporting work to be performed by the work machine 1. The ancillary equipment includes an unmanned plane 40, a flight control device 50, and a remote operation device 52.

The work machine 1 carries out predetermined work in cooperation with the unmanned plane 40. The work machine 1 includes a crawler-type lower traveling body 110, an upper turning body 120 mounted on the lower traveling body 110 so as to be turnable through a turning mechanism 130, and a work device 140. The upper turning body 120 includes a cab (operation chamber) 122 located on the front and left part thereof. The work device 140 is attached to the front center of the upper turning body 120 and makes a work motion. The work machine 1 may include, for example, a basement which the unmanned plane 40 takes off from and lands on. The turning mechanism 130 includes a not-graphically-shown turning motor to turn the upper turning body 120 to the lower traveling body 110.

The work device 140 includes a boom 141, an arm 143, a crusher 145, and a plurality of hydraulic cylinders. The boom 141 is mounted on the upper turning body 120 so as to be raiseable and lowerable. The arm 143 is rotatably connected to the distal end of the boom 141. The crusher 145 is a tip attachment which is rotatably attached to the distal end of the arm 143. In place of the crusher 145, may be attached other tip attachment, for example, a bucket, to the distal end of the arm 143.

The plurality of hydraulic cylinders include a boom cylinder 142, an arm cylinder 144, a bucket cylinder 146 and a pair of crusher cylinders 147, and each of the plurality of hydraulic cylinders is expanded and contracted by supply of hydraulic fluid thereto. The boom cylinder 142 is interposed between the boom 141 and the upper turning body 120 so as to move the boom 141 rotationally in rising and falling directions through the expansion and contraction of the boom cylinder 142. The arm cylinder 144 is interposed between the arm 143 and the boom 141 so as to move the arm 143 to the boom 141 rotationally about a horizontal axis through the expansion and contraction of the arm cylinder 144. The bucket cylinder 146 is interposed between the crusher 145 and the arm 143 so as to move the tip attachment, the crusher 145 in this embodiment, to the arm 143 rotationally about a horizontal axis through the expansion and contraction of the bucket cylinder 146. The pair of crusher cylinders 147 are attached to the crusher 145 so as to open and close the crusher 145 through expansion and contraction of the crusher cylinders 147.

The unmanned plane 40 is a rotorcraft, including a plurality of blades, an actuator for rotating the plurality of blades, for example, an electric motor, and a battery for supplying power to the actuator and the like. The number of the plurality of blades is, for example, 4, 6, or 8. In place of or in addition to the battery, may be provided a power supply cord that interconnects the unmanned plane 40 and a ground power source.

On the unmanned plane 40 are mounted a control device 400 and an image capture device 410.

The control device 400 controls the flight action of the unmanned plane 40 so as to achieve a plurality of flight forms of the unmanned plane, the flight modes corresponding to the control information and the control command input from the flight control device 50 and the operation information input from the remote operation device 52. The plurality of flight forms include forward flight, backward flight, climb, descent, and hovering. The hovering is a flight form in which the flight position and the flight attitude of the unmanned plane 40 are kept at the target flight position and the target flight attitude, respectively, that is, a form in which the unmanned plane 40 is kept stationary in the air.

The image capture device 410 acquires an image to be provided to a worker of the work machine, for example, an operator, in order to support work to be performed by the work machine 1, the image being a frontward environment image which is an image frontward of the unmanned plane 40. The control device 400 transmits the thus acquired captured image to the work machine 1.

The image capture device 410 includes a camera which is an image capture device body. The type and the like of the camera are arbitrary; it may be, for example, a wide-angle camera. The image capture device 410 may be either removably attached to the unmanned plane 40 or rigidly fixed to the unmanned plane 40. The image capture device 410 captures a frontward environment image, which is an image frontward of the body of the unmanned plane 40, by use of a image capture element such as a CCD (charge-coupled device) or CMOS (complementary metal oxide semiconductor). The image capture device 410, for example, may be configured to capture the frontward environment image in real time and to supply it to the control device 400 in a stream format with a predetermined frame period.

The image capture device 410, preferably, further includes a not-graphically-shown gimbal, i.e., a turning table. The gimbal rotates the image capture device body relatively to the unmanned plane 40 so as to keep the direction of the optical axis of the image capture device body of the image capture device 410 constant (e.g., a predetermined direction in the horizontal plane) regardless of the change in the attitude of the unmanned plane 40.

The flight control device 50 executes control of flight actions of the unmanned plane 40 in cooperation with the control device 400. The flight control device 50 is composed of, for example, a server computer, wherein the flight control device 50 is connected to the work machine 1 and the unmanned plane 40 so as to be communicable therewith via a not-graphically-shown network. The network may include a wireless communication network, the Internet, a VPN (Virtual Private Network), a WAN (Wide Area Network), a wired network, or any combination thereof. At least a part of the functions of the flight control device 50 may be included in the control device 10 mounted on the work machine 1. For example, the flight control device 50 may be mounted on the work machine 1. Alternatively, at least a part of the functions of the flight control device 50 may be included in the control device 400 mounted on the unmanned plane 40. Alternatively, at least a part of the functions of the flight control device 50 may be distributed to at least two of a server, the control device 10 mounted on the work machine 1, and the control device 400 mounted on the unmanned plane 40.

The remote operation device 52 is, for example, a remote controller, being operable by a user. The user may be either an operator who operates the work machine 1 or another worker. The user, if being an operator who operates the work machine 1, may bring the remote operation device 52 into the cab 122. The remote operation device 52 is capable of wireless communication with the unmanned plane 40 and transmits an operation signal, which corresponds to an operation applied to the remote operation device 52 by the user, toward the unmanned plane 40. When receiving the operation signal from the remote operation device 52, the control device 400 mounted on the unmanned plane 40 performs a control for actualizing the movement of the unmanned plane 40 corresponding to the operation information included in the operation signal, the movement being forward, backward, upward, downward or the like. The remote operation device 52 is optional. The remote operation device 52 may be formed of a smart phone or the like.

Figure 2:
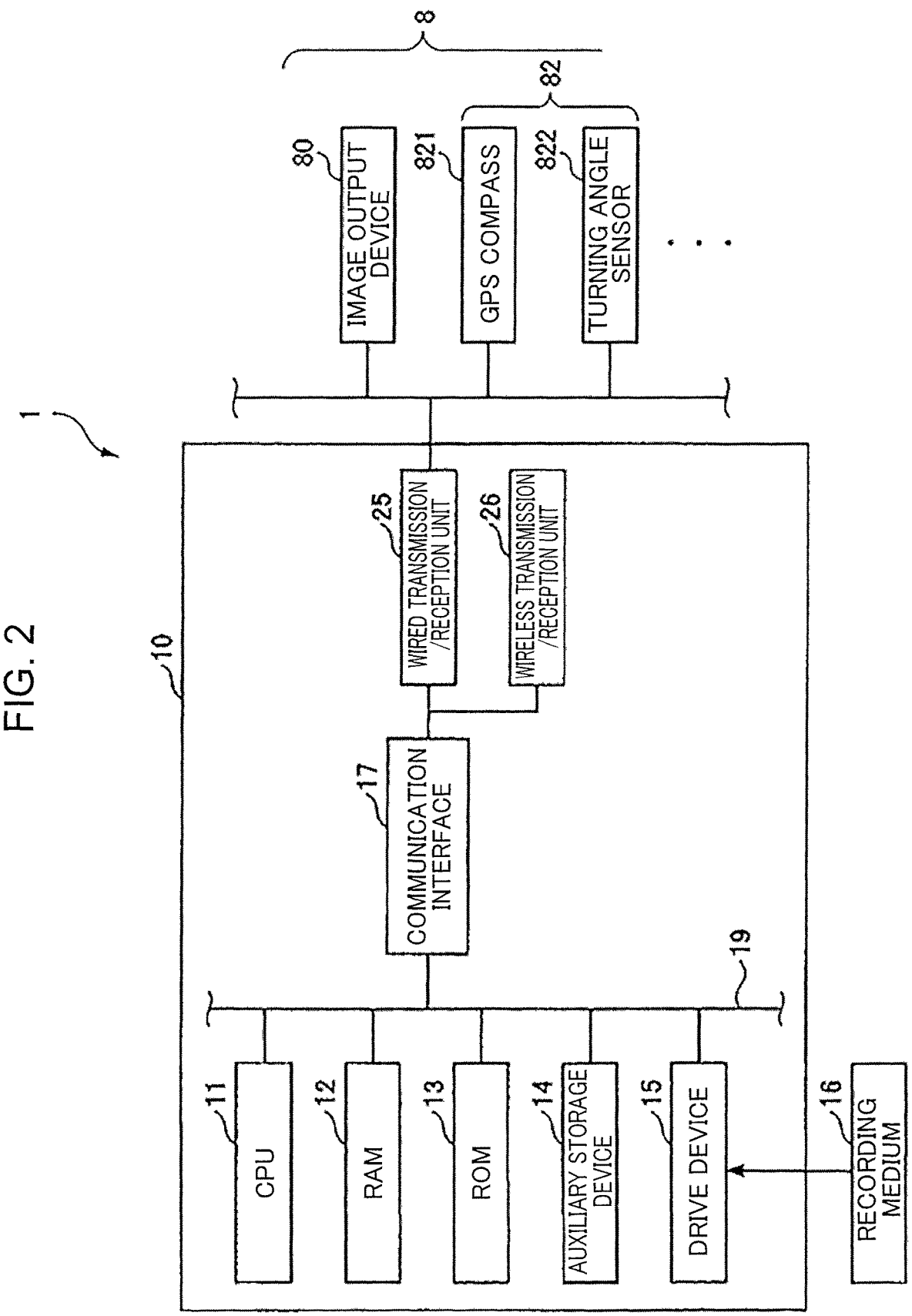
FIG. 2 is a diagram showing a configuration of hardware of a control system installed on the work machine.

FIG. 2 is a diagram showing an example of hardware forming a control system of the work machine 1.

As shown in FIG. 2, the work machine 1 is provided with an electrical system 8 and the control device 10.

The electrical system 8 includes an electronically controllable device and a plurality of sensors mounted on the work machine 1. The electrical system 8 includes, for example, an image output device 80 which is an example of a display device, a not-graphically-shown buzzer, an audio output device, a plurality of sensors 82 that detect respective operations applied to various operation members, and other electrical components. The above other electrical components include electrical components attached to a hydraulic pressure generation device shown in FIG. 3. The hydraulic pressure generation device hydraulically drives the turning mechanism 130, the work device 140, the lower traveling body 110 and others. The electrical system 8, especially, the great part of the plurality of sensors 82, are provided on the upper turning body 120, because the upper turning body 120 is less likely to be exposed to the external environment than the lower traveling body 110.

Figure 3:
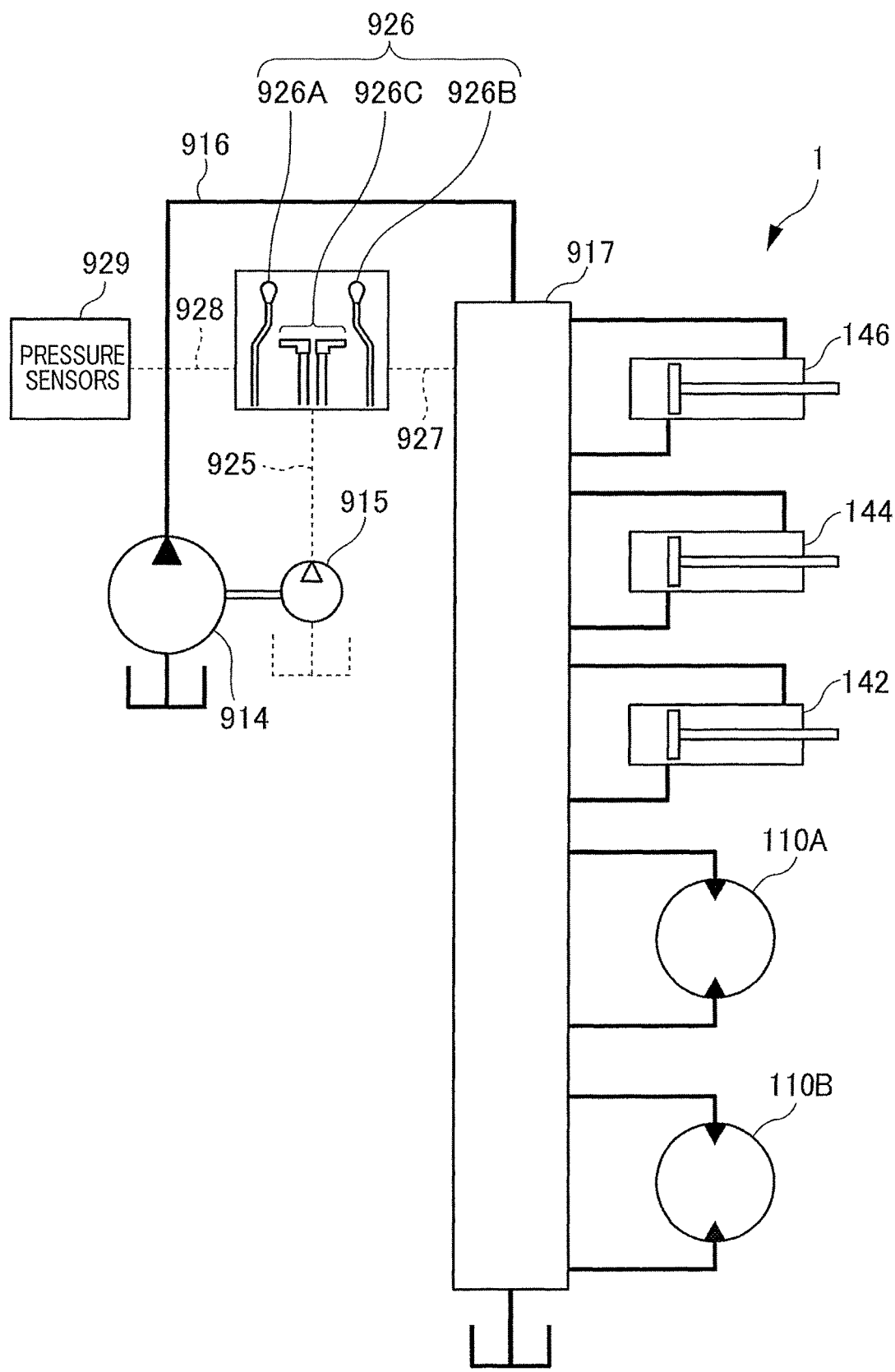
FIG. 3 is a diagram showing a hydraulic circuit installed on the work machine.

The hydraulic generation device includes at least one hydraulic pump that is driven by at least one of an engine and an electric motor, the at least one hydraulic pump including a main pump 914 shown in FIG. 3. If the at least one hydraulic pump includes a hydraulic pump to be driven by an electric motor, the hydraulic generation device may further include an inverter for driving the electric motor.

The plurality of sensors 82 include, for example, at least a part of a gyro sensor, a plurality of angle sensors, an acceleration sensor, an inclination sensor, and a plurality of pressure sensors that detect hydraulic pressures at predetermined respective locations of a plurality of hydraulic lines for applying hydraulic pressure to the requiring actuator from the hydraulic generation device. The plurality of hydraulic lines include a high pressure line 916 shown in FIG. 3, and the plurality of pressure sensors are provided in the high pressure line 916.

The plurality of sensors 82 according to this embodiment include a satellite-radio wave receiver, for example, a GPS (Global Positioning System) compass 821. The GPS compass 821 includes a pair of not-graphically-shown antennas, namely, GPS receivers, disposed on the upper turning body 120. The pair of antennas are spaced, each receiving a radio wave from the satellite. Respective satellite signals received by the pair of antennas are subjected to positioning processing by, for example, an interferometric positioning method or the like, thereby converted into position information. Based on the position information of each antenna, the orientation of the upper turning body 120 is calculated. The GPS compass 821, thus, calculates the orientation (azimuth) of the upper turning body 120 based on the relative positional relationship between the two antennas. In place of the GPS compass 821, may be used a similar compass that uses a part other than the GPS out of GNSS (Global Navigation Satellite System).

The image output device 80 shown in FIG. 1 is configured to output the captured image acquired by the image capture device 410, being provided in the cab 122 so as to allow an operator who operates the work machine 1 to visually recognize the captured image. The specific configuration of the image output device 80 is arbitrary. The image output device 80 is, for example, a liquid crystal display, an organic EL (Electro-Luminescence) display, or the like. The image output device 80 may be a portable device, for example, a tablet terminal, which can be brought into the cab 122 by an operator of the work machine 1.

As shown in FIG. 2, the control device 10 includes a CPU (Central Processing Unit) 11, a RAM (Random Access Memory) 12, a ROM (Read Only Memory) 13, an auxiliary storage device 14, a drive device 15, which are interconnected through a bus 19, a communication interface 17, a wired transmission/reception unit 25 and a wireless transmission/reception unit 26, these units 25 and 26 being connected to the communication interface 17.

The auxiliary storage device 14 is, for example, an HDD (Hard Disk Drive), an SSD (Solid State Drive), or the like, being a storage device that stores data related to application software or the like.

The wired transmission/reception unit 25 performs transmission and reception with other devices with use of a wired network. The wired transmission/reception unit 25 is connected with components included in the electrical system 8. A part or all of the components included in the electrical system 8 may be either directly connected to the bus 19 so as to bypass the wired transmission/reception unit 25 or connected to the wireless transmission/reception unit 26.

The wireless transmission/reception unit 26 performs transmission and reception with other devices with use of a wireless network, which is, for example, a wireless communication network of a cellular phone, the Internet, a VPN, a WAN, or the like. The wireless transmission/reception unit 26 may include at least one of a short-range wireless communication (Near Field Communication) unit, a Bluetooth (registered trademark) communication unit, a Wi-Fi (Wireless-Fidelity: registered trademark) transmission/reception unit, and an infra-red transmission/reception unit. The wireless transmission/reception unit 26 can communicate with the flight control device 50 even when the flight control device 50 is constituted by a server computer.

The control device 10 may be connectable to a recording medium 16 shown in FIG. 2. The recording medium 16 stores a predetermined program. The program stored in the recording medium 16 is installed in the auxiliary storage device 14 or the like of the control device 10 through the drive device 15. The predetermined programs thus installed can be executed by the CPU 11 of the control device 10. For example, the recording medium 16 may be a recording medium for optically, electrically or magnetically recording information thereon, such as a CD (Compact Disc)-ROM, a flexible disk, a magneto-optical disk, or the like, a semiconductor memory for electrically recording information such as a ROM, a flash memory, or the like. The recording medium 16 does not include a carrier wave.

The configuration of the hardware shown in FIG. 2, for example, can also be applied to the unmanned plane 40. Specifically, the control device 400 mounted on the unmanned plane 40 may have a configuration similar to the hardware configuration of the control device 10. In this case, the electrical system corresponding to the electrical system 8 includes the image capture device 410 and a plurality of sensors shown in FIG. 1.

The flight control device 50 may also have a hardware configuration substantially equivalent to the hardware configuration of the control device 10 shown in FIG. 2.

FIG. 3 shows a hydraulic circuit mounted on the work machine 1. The hydraulic circuit includes a plurality of hydraulic actuators, the main pump 914, a control valve unit 917, an operation device 926, and a plurality of hydraulic lines. The plurality of hydraulic actuators include a pair of traveling motors 110A and 110B, the turning motor that is not graphically shown, the boom cylinder 142, the arm cylinder 144, the bucket cylinder 146, and a plurality of pressure sensors 929. The pair of traveling motors 110A and 110B are hydraulic motors that generate respective torques for driving the right crawler and the left crawler of the lower traveling body 110. The turning motor is a hydraulic motor included in the turning mechanism 130 to generate a torque for turning the upper turning body 120 to the lower traveling body 110. The plurality of hydraulic lines include a plurality of high pressure lines that are indicated by respective solid lines in FIG. 3 and a low pressure line indicated by dashed lines.

The main pump 914 is composed of a hydraulic pump that is driven by a not-graphically-shown engine or the like to discharge hydraulic fluid, which is supplied to the plurality of hydraulic actuators through the high-pressure lines including the control valve unit 917. The main pump 914, thus, serves as a hydraulic source that generates hydraulic pressure for driving the plurality of hydraulic actuators.

The control valve unit 917 includes a plurality of control valves, which are interposed between the main pump 914 and the plurality of hydraulic actuators, respectively. The plurality of control valves are opened individually by a pilot operation applied thereto through the operation device 926, changing respective flow rates of hydraulic fluid supplied from the main pump 914 to the plurality of hydraulic actuators.

The pilot pump 915 is a hydraulic pump that is driven by the engine or the like, generating a pilot pressure necessary for the pilot operation.

The operation device 926, to which an operation is applied by an operator to move the plurality of hydraulic actuators, performs respective pilot operations of the plurality of control valves to move the plurality of hydraulic actuators in response to the applied operation. The operation device 926 includes an operation lever 926A, an operation lever 926B, and a pair of operation levers 926C. To the operation lever 926A is applied an arm operation for making hydraulic fluid be supplied to the arm cylinder 144 to actuate the arm 143. To the operation lever 926B are applied a boom operation and a crusher operation for making hydraulic fluid be supplied to the boom cylinder 142 and the bucket cylinder 146, respectively, to actuate the boom 141 and the crusher 145, respectively. To the pair of operation levers 926C are applied respective traveling operations for making hydraulic fluid be supplied to the pair of traveling motors 110A and 110B to cause the lower traveling body 110 to travel. Specifically, the pair of operation levers 926C include a left operation lever and a right operation lever. To the left operation lever is applied a left traveling operation for making hydraulic fluid be supplied to the traveling motor 110A to actuate the left crawler. To the right operation lever is applied a right traveling operation for making hydraulic fluid be supplied to the traveling motor 110B to actuate the right crawler. The pair of operation levers 926C may be configured to be a pair of pedals provided on the foot side of the operation seat.

The operation device 926 includes respective pilot valves for the plurality of control valves. Each of the pilot valves is connected to the pilot pump 915 via a pilot primary pressure line 925 and connected to a control valve corresponding to the pilot valve out of the plurality of control valves via a pilot secondary pressure line 927. Each of the pilot valves is opened in response to an operation applied to the operation levers 926A, 926B and 926C by an operator to thereby allow a pilot pressure corresponding to the operation to be applied to the control valve corresponding to the operation out of the plurality of control valves to open the control valve. Specifically, each of the pilot valves converts the pilot primary pressure supplied from the pilot pump 915 through the pilot primary pressure line 925 to a pilot secondary pressure corresponding to the magnitude of the operations applied to each of the operation lever 926A, 926B and 926C by an operator, and inputs the pilot secondary pressure to the control valve corresponding to the operation by the operator out of the plurality of control valves through the pilot secondary pressure line 927. Thus, the operation applied by an operator to each of the operation lever 926A, 926B and 926C of the operation device 926 is converted into a pilot pressure to be output from the operation device 926, and the control valve corresponding to the operation out of the plurality of control valves is opened by the input of the pilot pressure, whereby the hydraulic actuator corresponding to the operation out of the plurality of hydraulic actuators, namely, the traveling motors 110A and 110B, the boom cylinder 142, the arm cylinder 144, and the bucket cylinder 146, is supplied with hydraulic fluid, thus driving the drive target corresponding to the operation, out of the lower traveling body 110, the upper turning body 120, the boom 141, the arm 143, and the crusher 145.

The plurality of pressure sensors 929 detect respective pilot pressures supplied to the control valve unit 917 in response to respective operations applied to the operation levers 926A to 926C. Each of the pressure sensors 929 is connected to the operation device 926 via a pilot pressure detection line 928 and converts a pressure in the pilot pressure detection line 928, that is, a pressure corresponding to the pilot pressure, into an electrical signal, namely, a pilot pressure detection signal. The electric signals, which include information about the direction and the magnitude of respective operations applied to the operation levers 926A to 926C, are input to the control device 10. The operation applied to each of the operation levers 926A to 926C by an operator, alternatively, may be detected magnetically or optically.

Figure 5:
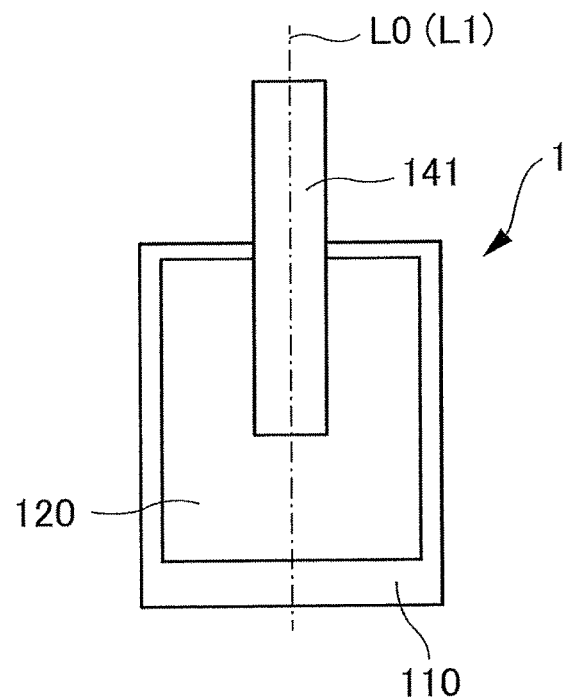
FIG. 5 is a plan view showing a state where the upper turning body is located at a reference turning position to the lower traveling body of the work machine.
Figure 6:
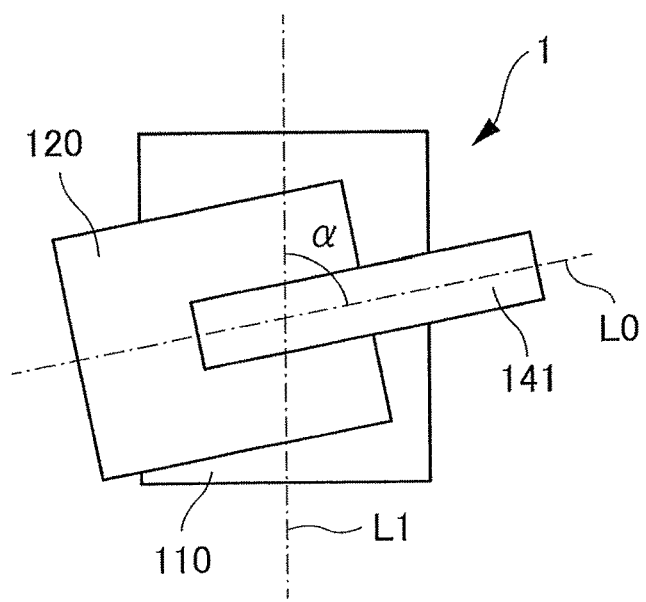
FIG. 6 is a plan view showing a state where the upper turning body is located at a position to which the upper turning body has been turned to the lower traveling body by a turning angle α from the reference turning position.

Next will be described in detail, with reference to FIGS. 4 to 6, respective functions of the control device 10, the control device 400 and the flight control device 50.

Figure 4:
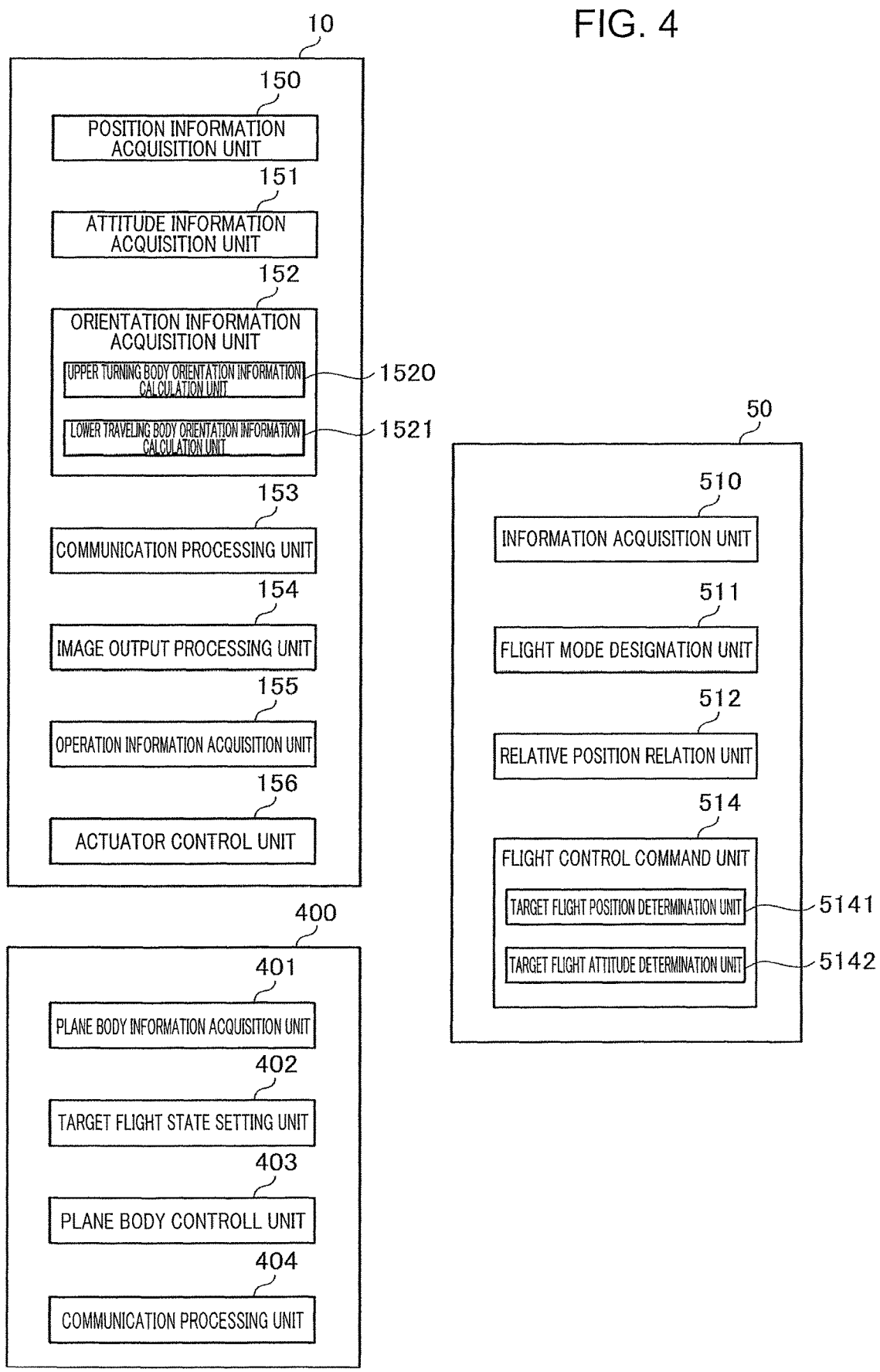
FIG. 4 is a block diagram showing functions performed by the control system.

FIG. 4 mainly shows the functions associated with the control for the hovering, and the control devices 10, 400 and 50 include other functions than those shown in FIG. 4. FIGS. 5 and 6 are plan views of the upper turning body 120 and the lower traveling body 110. FIG. 5 shows a neutral state where the upper turning body 120 is located at a reference turning position to the lower traveling body 110, and FIG. 6 shows a turning state where the upper turning body 120 is located at a position to which the upper turning body 120 has been turned to the lower traveling body 110 by a turning angle α from the reference turning position counter-clockwise viewed from above. The reference turning position is a turning position where the longitudinal axis of the lower traveling body 110 and the longitudinal axis of the upper turning body 120 overlap, the turning angle of the upper turning body 120 at the reference turning position being 0°.

The control device 10 mounted on the work machine 1 includes a position information acquisition unit 150, an attitude information acquisition unit 151, an orientation information acquisition unit 152, a communication processing unit 153, an image output processing unit 154, an operation information acquisition unit 155, and an actuator control unit 156, as shown in FIG. 4. Respective functions of the units 150 to 156 are allowed to be performed by the CPU 11 shown in FIG. 2 that executes a program stored in the ROM 13 shown in FIG. 2 or other storage device.

The position information acquisition unit 150 acquires the work machine position information that is information on the position of the work machine 1, from the GPS compass 821 included in the plurality of sensors 82. The work machine position information is represented by latitude, longitude, and altitude. The GPS compass 821 includes the GPS receiver and calculates latitude, longitude, and altitude based on radio waves from the satellite by use of interferometry or the like.

The attitude information acquisition unit 151 acquires an attitude parameter from at least one sensor that is included in the plurality of sensors 82 and detects the attitude parameter, and acquires a work machine attitude information, which is information on the attitude of the work machine 1, based on the attitude parameter. The attitude parameter is a parameter for determining the attitude of the work machine 1. The at least one sensor for detecting the attitude parameter includes, for example, a boom angle sensor, an arm angle sensor, a bucket angle sensor and a plane body inclination sensor. The boom angle sensor is a sensor that detects a boom angle, which is the angle of the boom 141 to the upper turning body 120 in the rising and falling direction. The arm angle sensor is a sensor that detects an arm angle, which is the angle of the arm 143 to the boom 141 in the direction of the rotational movement of the arm 143. The bucket angle sensor is a sensor that detects a bucket angle, which is the angle of the crusher 145 or another tip attachment, e.g., a bucket, to the arm 143 in the direction of the rotational movement of the crusher 145 or the like. The example of the angle sensors include: a rotation angle sensor that detects the rotation angle of the detection target around the rotation fulcrum (that is, a boom foot pin when the detection target is the boom 141); a stroke sensor that detects the stroke of the hydraulic cylinder for actuating the detection target (that is, the boom cylinder 142 when the detection target is the boom 141); and an inclination (acceleration) sensor that detects the inclination angle of the detection target. The plane body inclination sensor is a sensor that acquires a plane body inclination angle, which is, for example, the inclination angle of the upper turning body 120 to a horizontal plane.

The orientation information acquisition unit 152 acquires a work machine orientation information, which is information on the orientation of the work machine 1 (the orientation perpendicular to the vertical axis). The orientation information acquisition unit 152 according to this embodiment includes an upper turning body orientation calculation unit 1520 and a lower traveling body orientation calculation unit 1521.

The upper turning body orientation calculation unit 1520 calculates the orientation of the upper turning body 120 based on the information provided by the GPS compass 821 included in the plurality of sensors 82. The GPS compass 821, mounted on the upper turning body 120 as described above, is turned along with the upper turning body 120. The orientation (azimuth) detected by the GPS compass 821, therefore, is correlated to the orientation of the upper turning body 120. The GPS compass 821 according to this embodiment calculates the frontward orientation along the center axis L0 of the upper turning body 120 shown in FIGS. 5 and 6 as the orientation of the upper turning body 120, the center axis L0 being defined by use of the center axis of the boom 141 as a reference. The calculation function of the upper turning body orientation calculation unit 1520 may be possessed by the GPS compass 821.

The lower traveling body orientation calculation unit 1521 calculates the orientation of the lower traveling object 110 based on the turning angle information provided by the turning angle sensor 822 included in the plurality of sensors 82. The turning angle sensor 822 detects the turning angle around the turning axis of the upper turning body 120 to the lower traveling body 110. The turning angle detected by the turning angle sensor 822 is the angle by which the upper turning body 120 has been turned from the reference turning position. The reference turning position is the position where the center axis L0 of the upper turning body 120 and the center axis L1 of the lower traveling body 110 overlap as shown in FIG. 5. The center axis L1 of the lower traveling body 110 is perpendicular to respective rotation axes of the pair of crawlers. For example, in the turning state shown in FIG. 6, the center axis L0 of the upper turning body 120 forms an angle α greater than 0 degrees to the center axis L1 of the lower traveling body 110. In this turning state, the turning angle sensor 822 generates a detection signal corresponding to the angle α, which is the turning angle.

The lower traveling body orientation calculation unit 1521 calculates the orientation of the lower traveling body 110 based on the orientation of the upper turning body 120 and the turning angle α detected by the turning angle sensor 822. For example, when the orientation of the upper turning body 120 is true north in a state shown in FIG. 6, the orientation of the lower traveling body 110 is calculated as the orientation deviated westward from the true north by the turning angle α.

Thus, the work machine orientation information acquired by the orientation information acquisition unit 152 according to the present embodiment includes information on the orientation of the upper turning body 120, namely, the upper turning body orientation information, calculated by the upper turning body orientation calculation unit 1520, and information on the orientation of the lower traveling body 110, namely, the lower traveling body orientation information, calculated by the lower traveling body orientation calculation unit 1521.

The communication processing unit 153 transmits the information acquired by the position information acquisition unit 150, the attitude information acquisition unit 151, and the orientation information acquisition unit 152, to the flight control device 50. The communication processing unit 153 may be configured, for example, to transmit the latest information to the flight control device 50 at predetermined intervals in response to a request from the flight control device 50.

The communication processing unit 153 receives image data from the image capture device 410 mounted on the unmanned plane 40 through the control device 400. The image data is data of the captured image acquired by the image capture device 410, namely, the frontward environment image in this embodiment.

The image output processing unit 154 makes the image output device 80 output the captured image, based on the image data acquired by the communication processing unit 153. The captured image output by the image output device 80 (frontward environment image) allows an operator who operates the work machine 1 to grasp, for example, the situation of the work site that is invisible in the direct view.

The operation information acquisition unit 155 acquires operation information, which is information on the operation applied to the operation device 926 by an operator, from the plurality of pressure sensors 929 connected to the operation device 926.

The actuator control unit 156 generates a command value for controlling the drive state of the plurality of hydraulic actuators, based on the operation information input from the operation device 926. The actuator control unit 156, for example, outputs the command value for controlling the pressure or flow rate of the hydraulic fluid discharged from the main pump 914, based on the operation information.

The control device 400 mounted on the unmanned plane 40, as shown in FIG. 4, includes a plane body information acquisition unit 401, a target flight state setting unit 402, a plane body control unit 403, and a communication processing unit 404. Respective functions of the units 401 to 404 are allowed to be performed by CPU 11 shown in FIG. 2 or another CPU that executes programs stored in ROM 13 or other storage devices.

The plane body information acquisition unit 401 acquires plane body information which is information on the state of the plane body of the unmanned plane 40. The plane body information includes, for example, plane body position information that is information on the position of the unmanned plane 40, and plane body attitude information that is information on the attitude of the unmanned plane 40. The plane body position information is represented by, for example, latitude, longitude, and altitude. The plane body position information can be acquired from the GPS sensor. The plane body attitude information includes, for example, information on respective rotation angles about the yaw axis, the roll axis and the pitch axis of the unmanned plane 40. The body attitude information, alternatively, may be acquirable also from a sensor such as an IMU (Inertial Measurement Unit) mounted on the unmanned plane 40.

The target flight state setting unit 402 sets a target flight state of the unmanned plane 40 based on the control command input from the flight control device 50. The target flight state includes a target flight position and a target flight attitude. In this embodiment, the control command includes information on the target flight position and the target flight attitude as described below, which allows the target flight state setting unit 402 to directly use the target flight position and the target flight attitude included in the control command as they are. The target flight state setting unit 402, alternatively, may calculate at least one of the target flight position and the target flight attitude by itself as described above.

The plane body control unit 403 controls a not-graphically-shown plane body actuator mounted on the unmanned plane 40 so as to allow the target flight state set by the target flight state setting unit 402 to be actualized. The plane body actuator includes, for example, the electric motor for rotating the plurality of blades.

The communication processing unit 404 transmits plane body information and the like acquired by the plane body information acquisition unit 401 to the flight control device 50. For example, the communication processing unit 404 may transmit the latest body information to the flight control device 50 at predetermined intervals in response to a request from the flight control device 50.

The communication processing unit 404 transmits the data of the captured image (frontward environment image) acquired by the image capture device 410 to the work machine 1. For example, the communication processing unit 404 may transmit the data of the captured image at every predetermined cycle, in response to a request from the flight control device 50, to the flight control device 50.

As shown in FIG. 4, the flight control device 50 includes an information acquisition unit 510, a flight mode designation unit 511, a relative positional relationship determination unit 512, and a flight control command unit 514. Respective functions of the units 510 to 514 are allowed to be performed by CPU 11 shown in FIG. 2 or another CPU that executes programs stored in ROM 13 or other storage devices.

The information acquisition unit 510 acquires information necessary for execution of the control operation by the flight control command unit 514. The information acquisition unit 510 according to the present embodiment acquires the work machine position information, the work machine attitude information, and the work machine orientation information, which are information on the position, attitude, and orientation of the work machine 1, respectively, and the plane body information, which is information on the plane body of the unmanned plane 40. The work machine attitude information is, for example, attitude information usable for deriving the position of the crusher 145 or other end attachment, and includes, for example, information on respective attitudes of the arm 143, the boom 141, and the like. The information acquisition unit 510 further acquires the operation information from the operation device 926, as appropriate, particularly information on the operation applied to the operation levers 926C. The work machine position information, the work machine attitude information, and the work machine orientation information can be acquired through a signal transmitted from the communication processing unit 153 of the control device 10 mounted on the work machine 1. Besides, the plane body information can be acquired from the communication processing unit 404 of the control device 400 mounted on the unmanned plane 40.

The flight mode designation unit 511 designates a specific flight mode from among a plurality of flight modes set in advance with respect to the flight action of the unmanned plane 40. The plurality of flight modes include a first flight mode and a second flight mode. The first flight mode is a flight mode for allowing the image capture device 410 to acquire a peripheral monitoring image which is a captured image for monitoring the periphery of the work machine 1, that is, the frontward environment image, in this embodiment, as the captured image. The second flight mode is a flight mode for allowing the image capture device 410 to acquire a work support image which is a captured image for supporting work performed by the crusher 145 or other end attachment, that is, the frontward environment image in this embodiment, as the captured image. The first flight mode includes, in this embodiment, a flight mode in which the target flight state is set by use of the orientation of the lower traveling body 110 as a reference, namely, a lower follow-up mode, and a flight mode in which the target flight state is set by use of the orientation of the upper turning body 120 as a reference, namely, an upper follow-up mode.

The flight mode designation unit 511 designates, for example, a flight mode selected by a user from among the plurality of flight modes as a flight mode to be executed. The selection of the flight mode to be thus designated, namely, a designated flight mode, is made by, for example, a flight mode designation input by an operator to the control device 10 or the flight control device 50. The specific manner of the flight mode designation input may be arbitrary, for example, being an operation of a button, voice input, or gesture input. Upon the flight mode designation input to the control device 10, the control device 10 transmits designated flight mode information, which is information on the selected flight mode, to the flight mode designation unit 511 of the flight control device 50. The flight mode designation unit 511 appropriately changes the designated flight mode in response to the designated flight mode information.

In place of or in addition to the response to the above-mentioned flight mode designation input, the flight mode designation unit 511 may be configured to judge whether or not respective flight mode designation conditions preset for the plurality of flight modes are satisfied to automatically change the designated flight mode. The flight mode designation unit 511, for example, may be configured to determine the designated flight mode based on the operation information provided by the operation device 926. Specifically, the flight mode designation unit 511 is preferably configured to designate the first flight mode when a condition that a traveling operation for making the lower traveling body 110 travel is applied to the operation device 926, which is a first flight mode designation condition, is satisfied. That is because the captured image (frontward environment image) acquired in the first flight mode is useful for an operator to perform the traveling operation for the work machine 1. Preferably, the flight mode designation unit 511 is configured to designate the second flight mode when a condition that an operation for moving the crusher 145 or other end attachment is applied to the operation device 926, which is a second flight mode designation condition, is satisfied. That is because the captured image (frontward environment image) acquired in the second flight mode is useful for an operator to perform an operation of the crusher 145. For a situation where another operation, for example, a turning operation for turning the upper turning body 120, a boom operation for raising and lowering the boom 141, or an arm operation for rotating the arm 143, is performed, any of the first flight mode and the second flight mode is suitable. The flight mode designation unit 511, hence, may be configured to maintain the designated operation mode regardless of the input of the other operation.

The flight mode designation unit 511, alternatively, may have a plurality of designation modes. The plurality of designation modes include, for example, an automatic designation mode for automatically determining the designated flight mode based on the satisfaction of the preset flight mode designation condition as described above, and a manual designation mode for determining the designated flight mode based on the flight mode designation input performed by a user. It is more preferable that the flight mode designation unit 511 is configured to allow the designated mode to be selected by the user.

The relative positional relationship determination unit 512 determines the relative positional relationship of the unmanned plane 40 to the work machine 1. The determination is made based on the work machine position information and the machine body information acquired by the information acquisition unit 510. The relative positional relationship to be determined may be either a three-dimensional relative positional relationship including the height direction or a planar positional relationship without the height direction. The planar positional relationship is, for example, a positional relationship between the work machine 1 and the unmanned plane 40 which are projected on a predetermined reference plane (e.g., ground surface).

The relative positional relationship may be a relative positional relationship of the unmanned plane 40 to a reference part which is a specific part of the work machine 1. The reference part may be selected from the following parts: a part of the lower traveling body 110, for example, a part near the center of gravity; a part of the upper turning body 120; and a part of the work device 140, for example, the crusher 145. The reference part, alternatively, may be automatically changed in accordance with the designated flight mode or other conditions.

The flight control command unit 514 generates a control command based on the information acquired by the information acquisition unit 510, and transmits the control command to the control device 400 mounted on the unmanned plane 40. As described above, the control command is a command for making the target flight state setting unit 402 of the control device 400 set the target flight state. The flight control command unit 514 thus constitutes a flight control section in cooperation with the control device 400, and the flight control section controls the flight action of the unmanned plane 40.

The flight control command unit 514 generates a control command for making the unmanned plane 40 perform hovering when a preset hovering start condition is satisfied. The hovering start condition is, for example, that the unmanned plane 40 has reached the target flight position. It can be judged whether or not the unmanned plane 40 has reached the target flight position, for example, based on the plane body information acquired by the information acquisition unit 510.

The flight control command unit 514 can make the control device 400 perform the hovering control, for example, by making the target flight state setting unit 402 maintain the target flight position. The flight control command unit 514, alternatively, may be configured to make the control device 400 start the hovering control by input of a command for actively make the hovering control be started to the control device 400. The start command is, for example, a command for designating a hovering mode, in the case where the target flight state setting unit 402 has a plurality of state setting modes that include the hovering mode.

The flight control command unit 514 may be configured to cancel the hovering control when the relative positional relationship determined by the relative positional relationship determination unit 512 deviates from a preset reference relative positional relationship during execution of the hovering control. Furthermore, the flight control command unit 514 may be configured to maintain the hover control when the magnitude of the deviation of the relative positional relationship from the reference relative positional relationship is equal to or less than a preset threshold Th1. The reference relative positional relationship can be set to a relative positional relationship at the point in time when the unmanned plane 40 reaches the target flight position or before or after the point, for example, a relative positional relationship at the time when the hovering control is started. Alternatively, the reference relative positional relationship may be set by a user. For example, it is also possible to set, as the reference relative positional relationship, the relative positional relationship determined by the relative positional relationship determination unit 512 at the time when a predetermined input operation is performed by the user. It can be judged whether or not the hovering control is being executed, for example, based on the plane body information acquired by the information acquisition unit 510.

In addition to the hovering control, the flight control section according to this embodiment can perform a position follow-up control. The position follow-up control is a control of changing the target flight position along with the change in the relative positional relationship in contrast to the hovering control.

The flight control command unit 514 according to this embodiment includes a target flight position determination unit 5141 that determines the target flight position, and a target flight attitude determination unit 5142 that calculates the target flight attitude. The flight control command unit 514 generates the control command including the target flight position calculated by the target flight position determination unit 5141 and the target flight attitude calculated by the target flight attitude determination unit 5142.

The target flight position determination unit 5141 according to this embodiment determines the target flight position in a different manner according to the designated flight mode. Specific examples are as follows.

Figure 7:
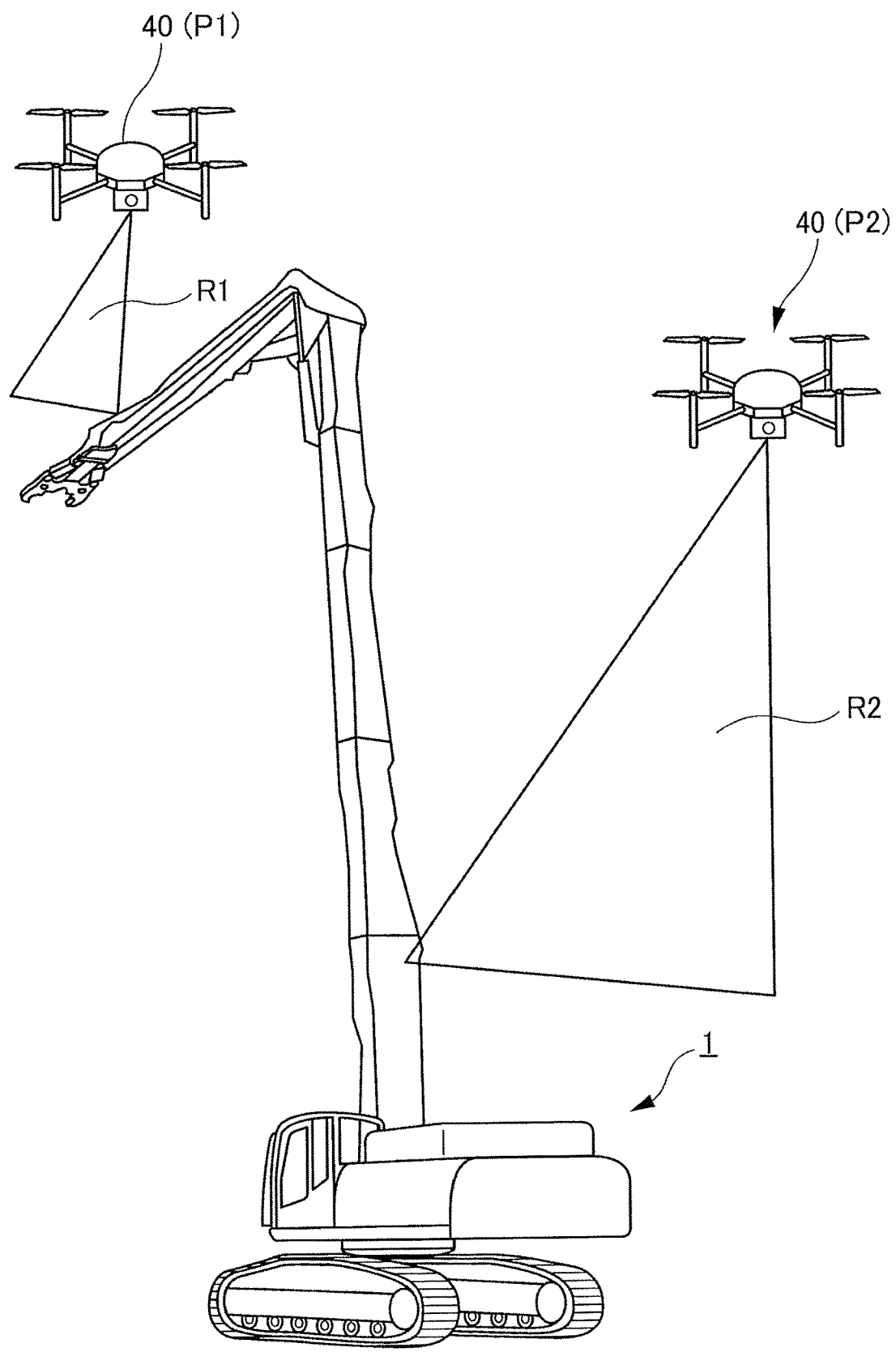
FIG. 7 is a perspective view showing an example of respective relative positions of the flying object to the work machine when the flight action of the flying object is controlled in the first flight mode and the second flight mode.

When the lower follow-up mode included in the first flight mode is designated as the designated flight mode, the target flight position determination unit 5141 sets the target flight position to a position behind the lower traveling body 110. The target flight position is expressed by, for example, latitude, longitude, and altitude. FIG. 7 shows the position (target flight position) P2 of the unmanned plane 40 in the first flight mode, and the view angle R2 of the image capture device 410 at that time. The latitude and longitude of the target flight position is set, for example, so as to make the target flight position be a position, on the longitudinal axis of the lower traveling body 110 of the work machine 1, separated rearward from the rear end of the lower traveling body 110 by a predetermined distance D1. The position of the lower traveling body 110 on the longitudinal axis corresponds to the above-described position on the center axis L1 of the lower traveling body 110 in a top view. This allows the longitudinal axis of the lower traveling body 110 to be determined based on the above-described lower traveling body orientation information. The predetermined distance D1 is arbitrary, for example, being about 20 m. The predetermined distance D1 may be changed by a user. The latitude and longitude of the target flight position may be set to laterally offset the target flight position from the longitudinal axis of the lower traveling body 110 by a predetermined distance D2. The predetermined distance D2 may be set, for example, so as to separate the target flight position from the rear end of the lower traveling body 110 in a direction intersecting about 45 degrees to the longitudinal axis, for example, about 20 m, together with the predetermined distance D1. The predetermined distance D2 may also be changed by a user.

When the upper follow-up mode included in the first flight mode is designated, the latitude and longitude of the target flight position are set so as to make the target flight position be a position separated rearward from the turning axis of the upper turning body 120 on the center axis L0 of the upper turning body 120. The target flight position, therefore, is changed along with the turn of the upper turning body 120. Alternatively, the target flight position for the upper follow-up mode may be set to a position on the turning axis, i.e., a position directly above the turning mechanism 130.

The target flight position corresponding to the first flight mode only has to be a position to allow the image capture device 410 to acquire a frontward environmental image that contains the entire work machine 1, that is, a captured image for performing peripheral monitoring; for example, it may be adapted according to the view angle or the like of the image capture device 410. The target flight position, alternatively, may be set to a position on the turning axis or a position frontward thereof, regardless of whether the lower follow-up mode or the upper follow-up mode is designated.

When the second flight mode is designated, the target flight position determination unit 5141 sets the target flight position to such a position as to allow the image capture device 410 to acquire a work support image for supporting work to be performed by the work device as the captured image. The target flight position, specifically, is such a flight position as to put the distal end of the crusher 145 within the view angle of the image capture device 410; for example, it may be set to the side or front of the work machine 1 in a top view. FIG. 7 shows the position (target flight position) P1 of the unmanned plane 40 in the second flight mode, and the view angle R1 of the image capture device 410 at that time. The position of the distal end of the crusher 145 is varied by not only the movement of the work device 140 including the arm 143 but also the turn of the upper turning body 120. It is preferable, therefore, that the target flight position corresponding to the second flight mode is set so as to be changed in accordance with the movement of at least one of the work device 140 and the upper turning body 120. For example, the target flight position determination unit 5141 sets the latitude and longitude of the target flight position so as to make the target flight position be a position separated from the turning axis by a predetermined (not shown) distance D3 in a lateral direction orthogonal to the center axis L0 of the upper turning body 120 in a top view and separated frontward from the turning axis by a predetermined (not shown) distance D4. The predetermined distances D3 and D4 also may be changed by a user.

The altitude of the target flight position may be constant, for example, in the range of 30 m to 40 m. The altitude, alternatively, may be changed either by a user or automatically according to the designated flight mode or the like. In the second flight mode, the altitude may be set based on the rising angle of the boom 141, specifically, so as to be increased with the rise of the boom 141.

The target flight attitude can be expressed, for example, by respective rotation angles around a yaw axis, a roll axis, and a pitch axis or respective parameters corresponding thereto. The target flight attitude may be set, for example, so as to render the longitudinal axis of the plane body of the unmanned plane 40 parallel to the longitudinal axis of the lower traveling body 110 in a horizontal plane. The parameters relating to the target flight attitude may be changed either by a user or automatically in accordance with the designated flight mode. Alternatively, the target flight attitude may be set so as to render the longitudinal axis of the plane body of the unmanned plane 40 parallel with the center axis of the arm 143 in a horizontal plane.

For example, when the upper follow-up mode included in the first operation mode is designated, the target flight attitude, regarding the rotation angle around the yaw axis, may be set so as to render the optical axis of the image capture device 410 parallel to the center axis L0 of the upper turning body 120 in a top view.

When the lower follow-up mode included in the first operation mode is designated, the target flight attitude may be set, regarding the rotation angle around the yaw axis, so as to render the optical axis of the image capture device 410 parallel to the center axis L1 of the lower traveling body 110 in the top view.

The target flight attitude when the second operation mode is designated is preferably set so as to put the crusher 145 or other end attachment within the view angle of the image capture device 410. More preferably, the target flight attitude is set so as to put the crusher 145 substantially at the center in the view angle of the image capture device 410. The target flight attitude may be set so as to put both the crusher 145 and a work object (e.g., an object to be disassembled in the case of disassembly work) within the view angle of the image capture device 410. It is preferable that the target flight attitude is set so as to put at least the distal end of the crusher 145 within the view angle of the image capture device 410. For example, it is possible to calculate the position of the distal end of the crusher 145 to calculate such a target flight attitude of the unmanned plane 40 that the optical axis of the image capture device 410 passes through the calculated position.

Regarding the rotation angle around the roll axis, it is preferable to set the target flight attitude so as to render the plane body of the unmanned plane 40 substantially horizontal in both of the first flight mode and the second flight mode.

Figure 8:
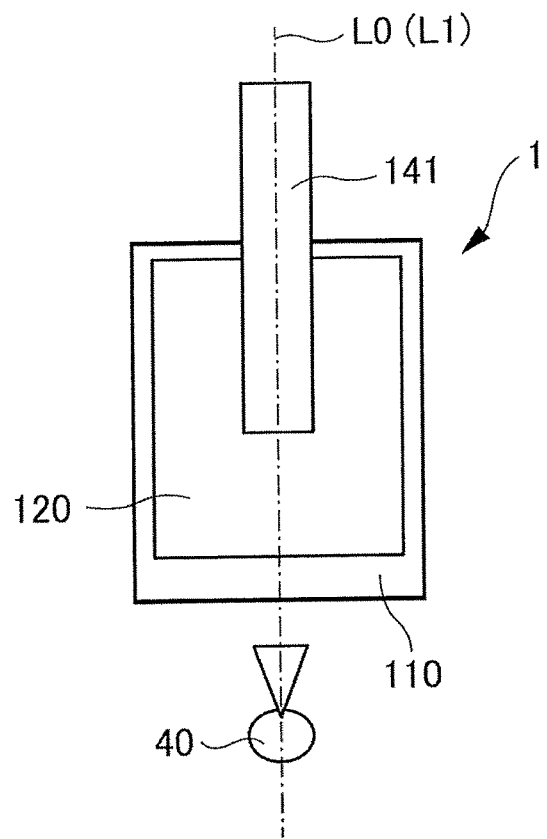
FIG. 8 is a plan view showing an example of the target flight position of the flying object in a lower follow-up mode while the upper turning body is located at the reference turning position to the lower traveling body.
Figure 9:
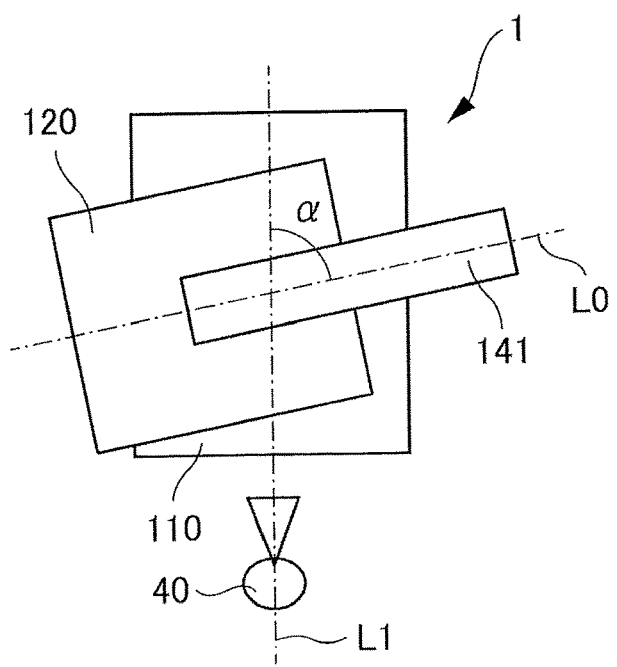
FIG. 9 is a plan view showing an example of the target flight position in the lower follow-up mode while the upper turning body is located at a position to which the upper turning body has been turned to the lower traveling body by a turning angle α from the reference turning position.

FIGS. 8 and 9 show an example of the latitude and the longitude of the target flight position that are determined when the lower follow-up mode is designated. When the lower follow-up mode is designated, the latitude and longitude of the target flight position are set so as to make the target flight position be a position behind the lower traveling body 110, as described above. Hence, either in the neutral state where the center axis L0 of the upper turning body 120 and the center axis L1 of the lower traveling body 110 overlap as shown in FIG. 8 or in the turning state where the center axis L0 of the upper turning body 120 and the center axis L1 of the lower traveling body 110 intersect each other as shown in FIG. 9, the latitude and longitude of the target flight position is set to be a position behind the lower traveling body 110.

Such setting of the target flight position for the lower follow-up mode allows the image capture device 410 mounted on the unmanned plane 40 to stably acquire a captured image (frontward environment image) from a position behind the lower traveling body 110 on the center axis L1 of the lower traveling body 110. Furthermore, appropriately setting the target flight attitude as described above allows the image capture device 410 to acquire a frontward environment image that captures the work machine 1 and the periphery thereof, that is, a highly useful captured image from the viewpoint of peripheral monitoring.

The target flight position determination unit 5141 of the flight control device 50 according to this embodiment, setting the latitude and longitude of the target flight position in accordance with the orientation of the lower traveling body 110 when the lower follow-up mode is designated, allows the captured image (frontward environment image) provided by the image capture device 410 to follow the traveling motion of the work machine 1 in the turning state. This allows, even if the lower traveling body 110 travels in a turning state where the upper turning body 120 is located at a position to which the upper turning body 120 has been turned from the reference turning position when the lower follow-up mode is designated, the frontward environment image provided by the image capture device 410 of the unmanned plane 40 to keep its high usefulness (for the user). From this viewpoint, the flight mode designation unit 511 may be configured to designate the lower follow-up mode when the work machine 1 is not traveling and configured to designate a flight mode other than the lower follow-up mode, for example, the upper follow-up mode or the second flight mode, when the work machine 1 is traveling.

For the case of monitoring the surroundings of the work machine 1 with use of the unmanned plane 40, it is appropriate to set the target flight position of the unmanned plane 40 to a position directly above or behind the work machine 1; in contrast, for the case of supporting work to be performed by the work machine 1 such as a disassembly work, it is appropriate to set the target flight position of the unmanned plane 40 to a position on the lateral side of the work machine.

Also from this point of view, it is preferable that the flight mode designation unit 511 according to the present embodiment appropriately switches the designated flight mode with respect to the flight action of the unmanned plane 40 between the first flight mode and the second flight mode, and that the flight control command unit 514 and the control device 400 control the flight action of the unmanned plane 40 so as to actualize the designated flight mode, as described above. This enables the image capture device 410 mounted on the unmanned plane 40 to provide respective captured images, i.e., frontward environment images in this embodiment, suitable for both peripheral monitoring and work support.

Next will be described the arithmetic control operation performed in the present embodiment with reference to FIGS. 10 to 15.

Figure 10:
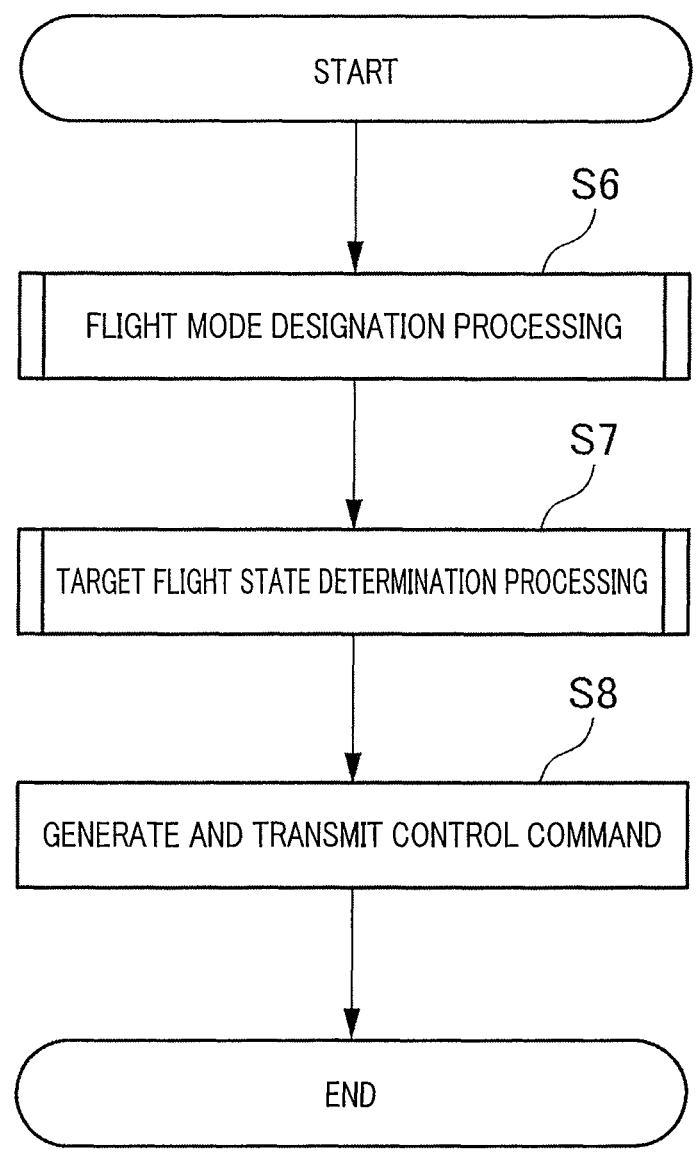
FIG. 10 is a flowchart showing a main routine of a flight action control that is executed by the flight control device.

FIG. 10 is a schematic flowchart showing an example of a processing executed by the flight control device 50 with respect to the flight control of the unmanned plane 40. The processing shown in FIG. 10 may be repeated, for example, every predetermined cycle. The order of the steps shown in FIGS. 10 to 14 may be interchanged so long as the relationship between the input and output of the flight control device 50 is not impaired.

Figure 11:
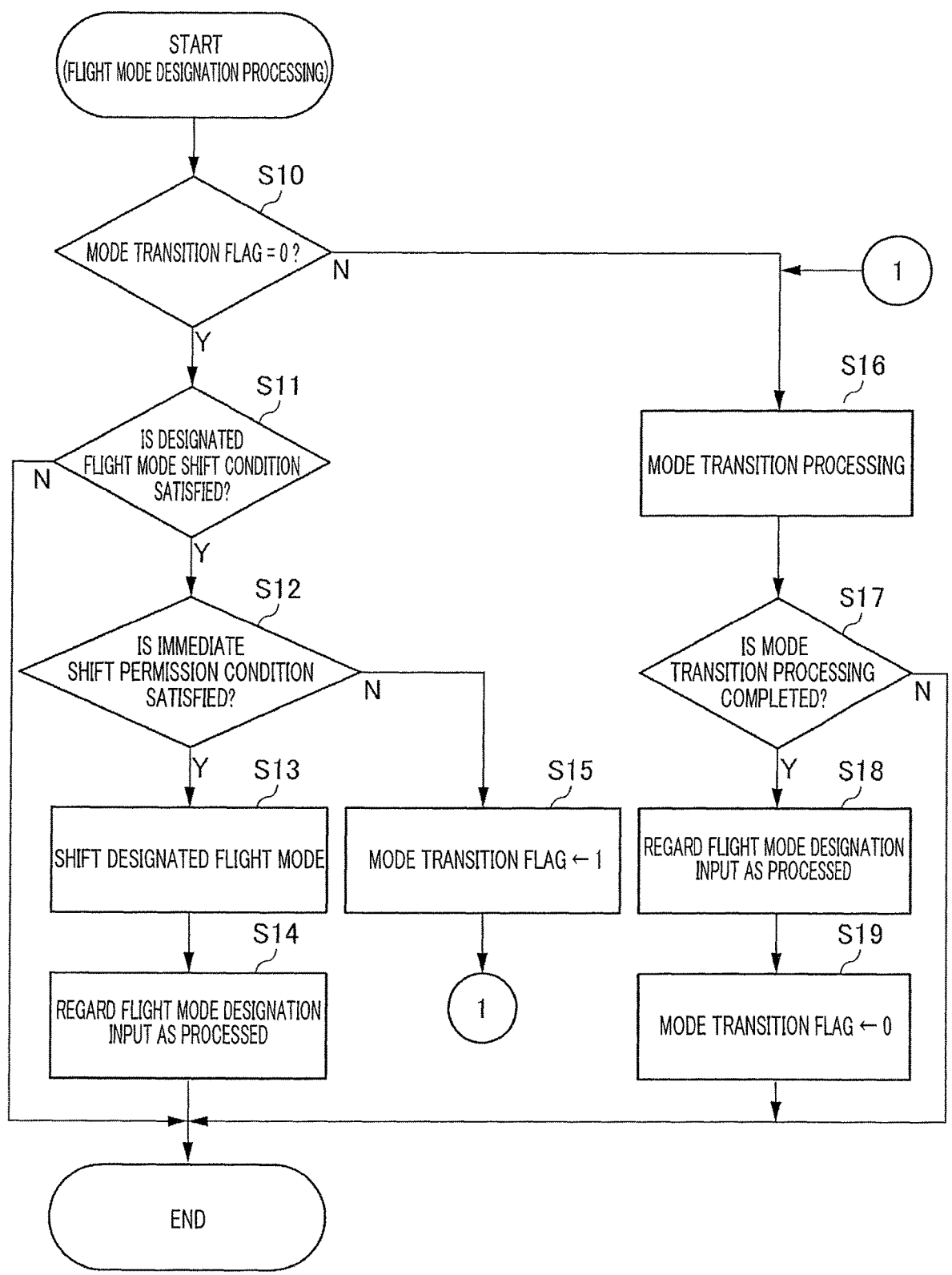
FIG. 11 is a flowchart showing a mode designation processing included in the flight action control.

First, the flight mode designation unit 511 of the flight control device 50 executes a processing of designating the flight mode of the unmanned plane 40, namely, a flight mode designation processing shown in FIG. 11 (step S6 in FIG. 10).

Figure 12:
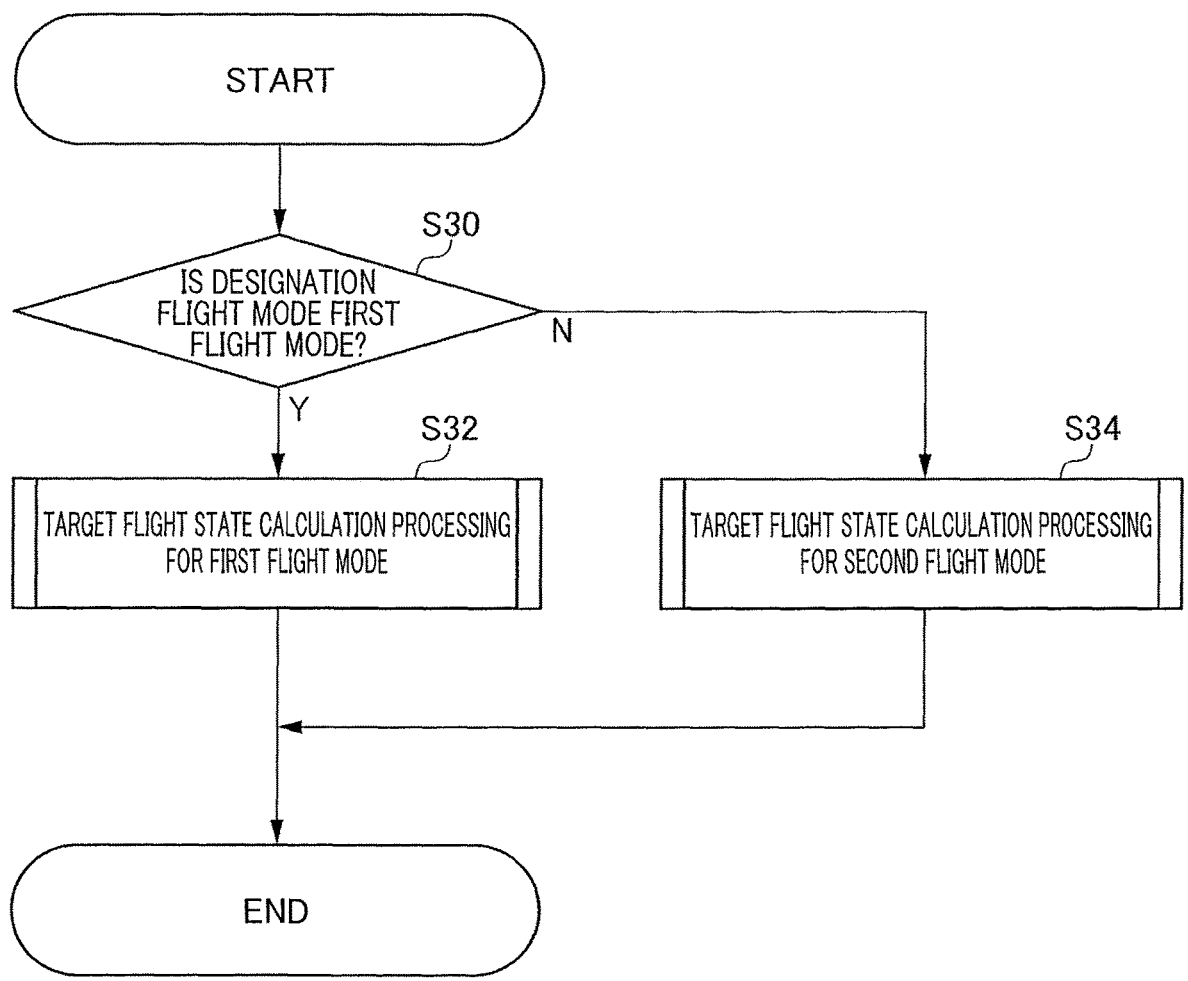
FIG. 12 is a schematic flowchart showing a target flight state setting processing included in the flight action control.

Next, the flight control command unit 514 of the flight control device 50, based on the flight mode thus designated, executes a processing of determining the target flight position and the target flight attitude which are the target flight state of the unmanned plane 40, namely, a target flight state determination processing shown in FIG. 12 (step S7), generating a control command for instructing the determined target flight position and target flight attitude and transmitting the control command to the control device 400 mounted on the unmanned plane 40 (step S8).

Next will be described the specific contents of the flight mode designation processing with reference to the flowchart of FIG. 11.

First, the flight mode designation unit 511 of the flight control device 50 judges whether or not the mode transition flag is "0" (step S10). The mode transition flag is a flag that is set to allow whether or not the mode transition processing should be performed at the present time to be judged, the mode transition processing being a processing for safely shifting the currently designated flight mode to another newly designated flight mode. The mode transition flag is set to "1" only during the period from the start to the end of the mode transition processing. The initial value of the mode transition flag is "0".

When the mode transition flag is 0 (YES in step S10), the flight mode designation unit 511 judges whether or not a flight mode designation condition for allowing a flight mode different from the currently designated flight mode to be designated is satisfied, in other words, whether or not a designated flight mode shift condition that requires the currently designated flight mode to be shift to another flight mode is satisfied (step S11). The designated flight mode shift condition is, for example, that a flight mode designation input for designating a flight mode different from the currently designated flight mode is performed by a user. It is also possible that the flight mode designation unit 511 automatically judges the satisfaction of the designated flight mode shift condition based on a preset flight mode designation condition. For example, when the flight mode designation condition for the second flight mode is satisfied in which the work machine 1 moves to the work position while the first flight mode is designated and then the work machine 1 arrives at the work position and the crusher 145 moves to the work object, the flight mode designation unit 511 can judge that the designated flight mode shift condition from the first flight mode to the second flight mode is satisfied. Alternatively, even when the flight mode designation condition for the second flight mode is that the work machine 1 arrives at the work position and the upper turning body 120 turns, it can be judged that the designated flight mode shift condition from the first flight mode to the second flight mode is satisfied when the flight mode designation condition for the second flight mode is satisfied while the first flight mode is designated.

When the designated flight mode shift condition is satisfied (YES in step S11), the flight mode designation unit 511 judges whether or not a preset immediate shift permission condition is satisfied (step S12). The immediate shift permission condition is a condition for judging whether or not the currently designated flight mode is permitted to be immediately shifted to the next designated flight mode, specifically, whether or not the immediate shift of the designated flight mode can be performed without inconvenience. For example, the immediate shift permission condition is set so as to be judged to be not satisfied when the shift of the designated flight mode (i.e., the shift of the target flight position) involves the movement of the unmanned plane 40 which may cause contact or proximity of the unmanned plane 40 with the work machine 1 (for example, the boom 141 of the work machine 1). In other words, the immediate shift permission condition according to the present embodiment is a condition under which the immediate shift of the designated flight mode can be performed without the contact or proximity of the unmanned plane 40 with the work machine 1. The proximity of the unmanned plane 40 with the work machine 1 means that the unmanned plane 40 is enough close to the work machine 1 to render the shortest distance between the unmanned plane 40 and the work machine 1 smaller than a preset allowable distance.

When the immediate shift permission condition is satisfied (YES in step S12), the flight mode designation unit 511 immediately shifts the currently designated flight mode to a new flight mode (step S13). For example, when a mode designation input for designating the second flight mode is performed in a state where the first flight mode is designated, the flight mode designation unit 511 immediately shifts the currently designated flight mode from the first flight mode to the second flight mode only when the immediate shift permission condition is satisfied (YES in step S12). Upon this shift, the flight mode designation unit 511 makes the flight mode designation input be regarded as having been processed (step S14).

When the immediate shift permission condition is not satisfied (NO in step S12), the flight control command unit 514 determines the content of the mode transition processing and sets the mode transition flag to "1" (step S15). The mode transition processing is a processing for allowing the shift from the currently designated flight mode to the next designated flight mode to be performed with the movement of the unmanned plane 40 which involves no contact or no proximity of the unmanned plane 40 with the work machine 1. This embodiment includes a mode transition processing for shifting the designated flight mode between the lower follow-up mode included in the first flight mode and the second flight mode. This mode transition processing is a processing of interposing the upper follow-up mode included in the first flight mode between the lower follow-up mode and the second flight mode, that is, a processing of shifting the designated flight mode between the lower follow-up mode and the second flight mode via the upper follow-up mode.

Figure 15:
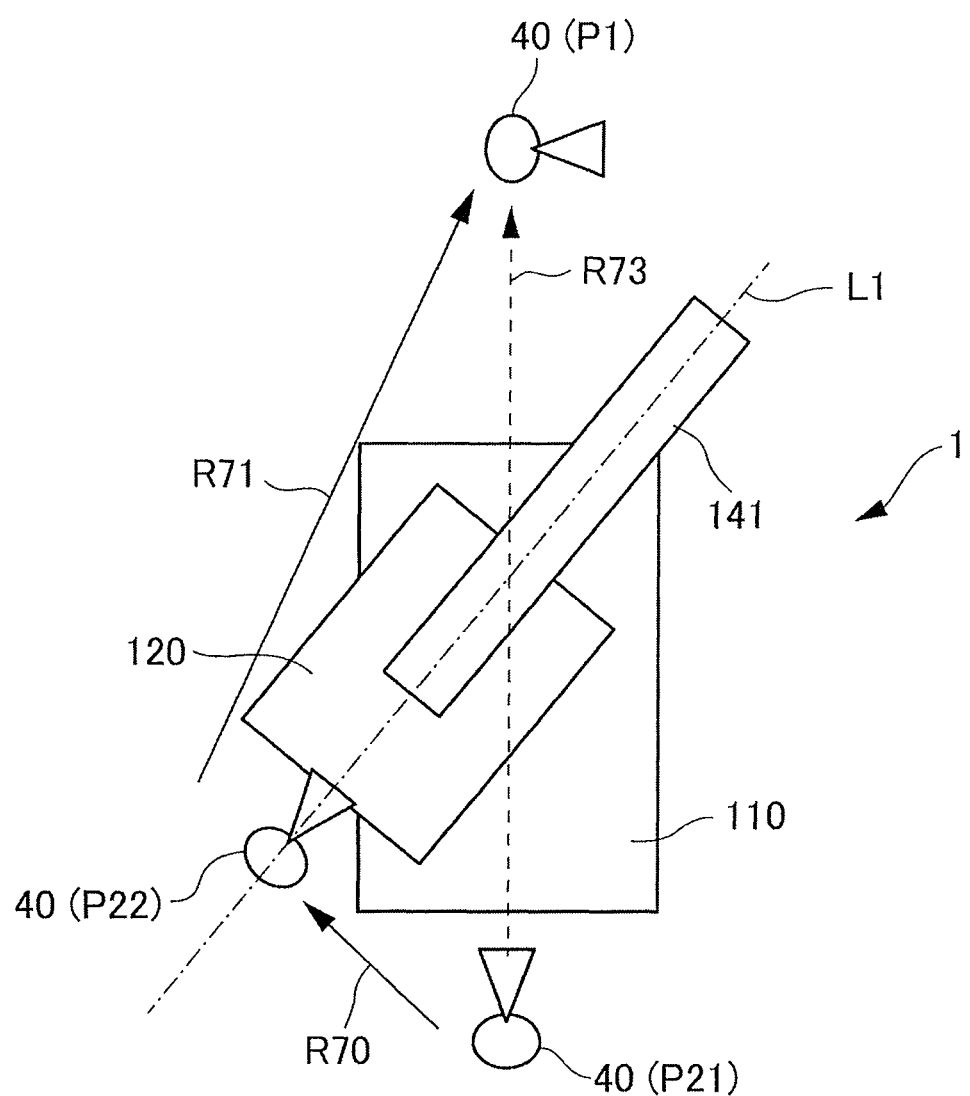
FIG. 15 is a plan view showing an example of the flight action of the flying object when the mode transition processing is performed.

FIG. 15 shows an example of the flight of the unmanned plane 40 that is performed during the transition from the lower follow-up mode to the second flight mode. The unmanned plane 40 is moved from the target flight position P21 according to the lower follow-up mode to the target flight position P22 according to the upper follow-up mode as indicated by the arrow R70 in FIG. 15, then, moved to the target flight position P1 according to the second flight mode as indicated by the arrow R71. This allows the designated flight mode to be safely shifted from the lower follow-up mode to the second flight mode without contact or proximity of the unmanned plane 40 with the work machine 1, for example, the boom 141, in contrast to the case where the unmanned plane 40 is moved directly, i.e., by the shortest distance, from the target flight position P21 according to the lower follow-up mode to the target flight position P1 according to the second flight mode as shown by the dotted arrow R73 in FIG. 15.

The mode transition processing may involve raising the unmanned plane 40. The target height of the unmanned plane 40 to be thus raised may be determined using, as a reference, either the highest part of the boom 141 at the point in time when the mode transition processing is started or the maximum height within the movable range of the boom 141. For example, the mode transition processing for shifting the designated flight mode from the lower follow-up mode to the second flight mode may involve raising the unmanned plane 40 from the target flight position P21 according to the lower follow-up mode to the target height, in advance of the shift to the second flight mode. This allows the raised unmanned plane 40 to be moved safely and by the shortest distance from the target flight position P21 to the target flight position P1 according to the second flight mode as shown by the dotted arrow R73 in FIG. 15. Alternatively, the mode transition processing may be one of moving the unmanned plane 40 that has been raised to the predetermined height to the target flight position P22 according to the upper follow-up mode as indicated by the arrow R70, and then moving the unmanned plane 40 to the target flight position P1 according to the second flight mode as indicated by the arrow R71. This allows contact or proximity of the unmanned plane 40 with the work machine 1 to be more reliably prevented.

Thereafter, while the mode transition flag is 1 (NO in step S10), the flight control command unit 514 executes the mode transition processing (step S16) in accordance with the content determined in step S15. Upon the completion of the mode transition processing (YES in step S17), the flight mode designation unit 511 makes the mode designation input be regarded as having been performed (step S18), and resets the mode transition flag to "0" (step S19).

The execution of the above-described mode transition processing allows the designated flight mode to be shifted with high safety.

The mode transition processing may alternatively include automatically retracting the work machine 1, for example, the boom 141, to a safe position where the work machine 1 can avoid contact or proximity with the unmanned plane 40 (e.g., the lowest position) prior to the shift of the designated flight mode. This allows the unmanned plane 40 to be moved at the shortest distance from the target flight position P21 to the target flight position P1 according to the second flight mode. Even in this case, however, the unmanned plane 40 may be controlled to move at the shortest distance, for example, from the target flight position P21 according to the lower follow-up mode to a predetermined height corresponding to the highest position of the work machine 1 and thereafter move to the target flight position P1 according to the second flight mode as shown by the dotted arrow R73 in FIG. 15.

Alternatively, it is also preferable to temporarily prohibit the motion of the work device 140 including the boom 141 from movement during the shift of the designated flight mode.

Next will be described the specific contents of the target flight state setting processing with reference to FIGS. 12 to 14.

The flight control command unit 514 of the flight control device 50 judges whether or not the currently designated flight mode is the first flight mode (step S30 shown in FIG. 12). When the designated flight mode is the first flight mode (YES in step S30), the flight control command unit 514 executes a target flight state calculation processing for the first flight mode (step S32); when the designated flight mode is not the first flight mode (NO in step S30), the flight control command unit 514 executes a target flight state calculation processing for the second flight mode (step S34).

Figure 13:
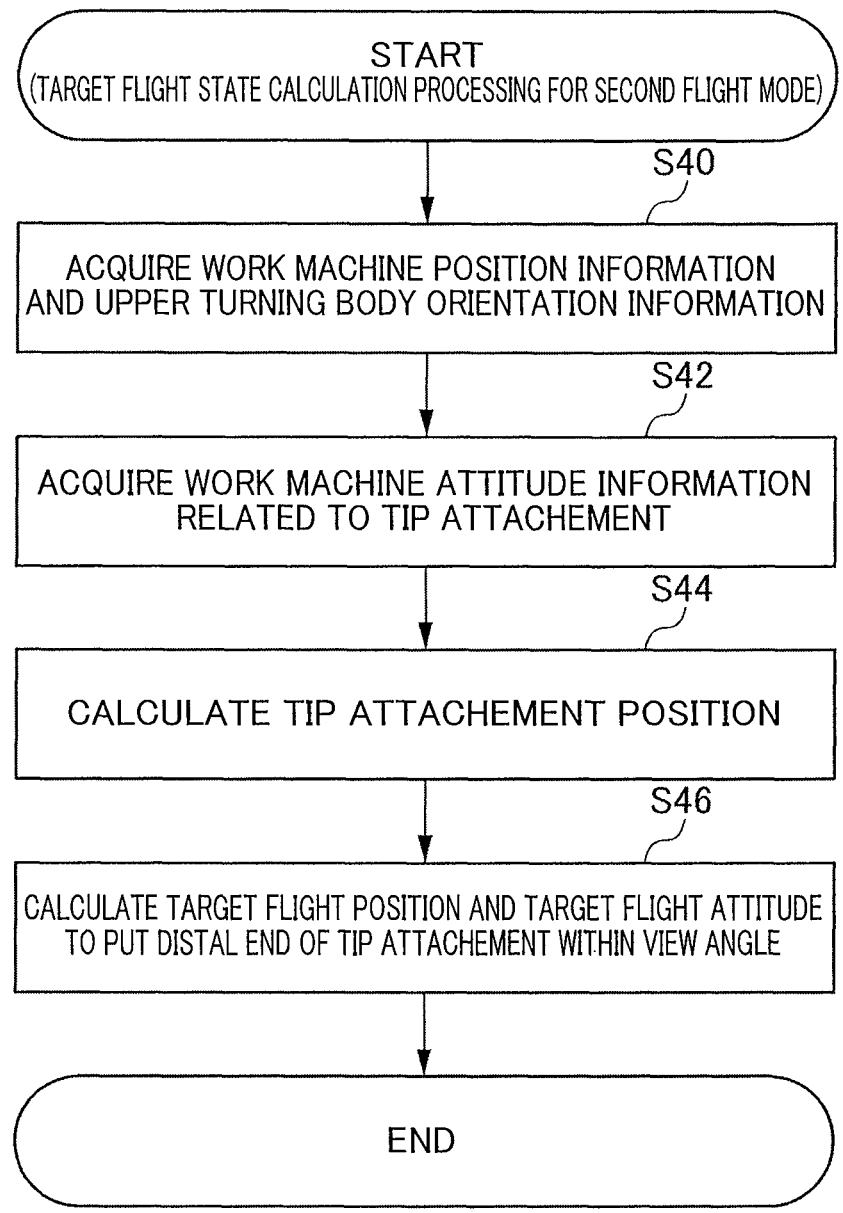
FIG. 13 is a flowchart showing a processing of calculating the target flight position and the target flight attitude in the second flight mode.

FIG. 13 shows a specific content of the target flight state calculation processing for the second flight mode.

The information acquisition unit 510 of the flight control device 50 acquires the work machine position information and the upper turning body orientation information from the control device 10 mounted on the work machine 1 (step S40). The work machine position information and the upper turning body orientation information are acquired by the position information acquisition unit 150 and the orientation information acquisition unit 152 of the control device 10, respectively, as described above, and transmitted to the flight control device 50.

Next, in step S42, the information acquisition unit 510 of the flight control device 50 acquires the work machine attitude information from the control device 10. The work machine attitude information, which is information related to the position of the crusher 145 or other end attachment, is acquired by the attitude information acquisition unit 151 of the control device 10 as described above and transmitted to the flight control device 50.

The flight control command unit 514 of the flight control device 50 calculates the position of the distal end of the crusher 145, namely, a tip attachment position (step S44), based on the work machine position information and the upper turning body orientation information which are acquired in step S40 and the work machine orientation information acquired in step S42. The position of the distal end of the crusher 145 is determined relatively to the upper turning body 120. Specifically, the position of the distal end of the crusher 145 to the upper turning body 120 is uniquely determined according to the respective attitudes of the boom 141 and the arm 143. In place of the position of the distal end of the crusher 145, may be calculated a position substantially equivalent to the position of the distal end, for example, the position of another part of the crusher 145 or the position of the distal end of the arm 143.

Based on the position of the distal end of the crusher 145 (tip attachment position) calculated in step S44, the flight control command unit 514 of the flight control device 50 calculates the target flight position and the target flight attitude of the unmanned plane 40 for putting the distal end in or near the center in the view angle of the image capture device 410 (step S46). Specifically, it is preferable to set the target flight position around the distal end of the crusher 145 as described above and to set the target flight attitude so as to put both the crusher 145 and the work object (e.g., an object to be disassembled) within the view angle of the image capture device 410 when the unmanned plane 40 is located at the target flight position, as described above.

Such determination of the target flight position and the target flight attitude for the second flight mode allows the image capture device 410 to acquire a work support image, which is a captured image for supporting the work performed by the crusher 145, specifically, a frontward environment image containing the distal end of the crusher 145 (and the work object).

Figure 14:
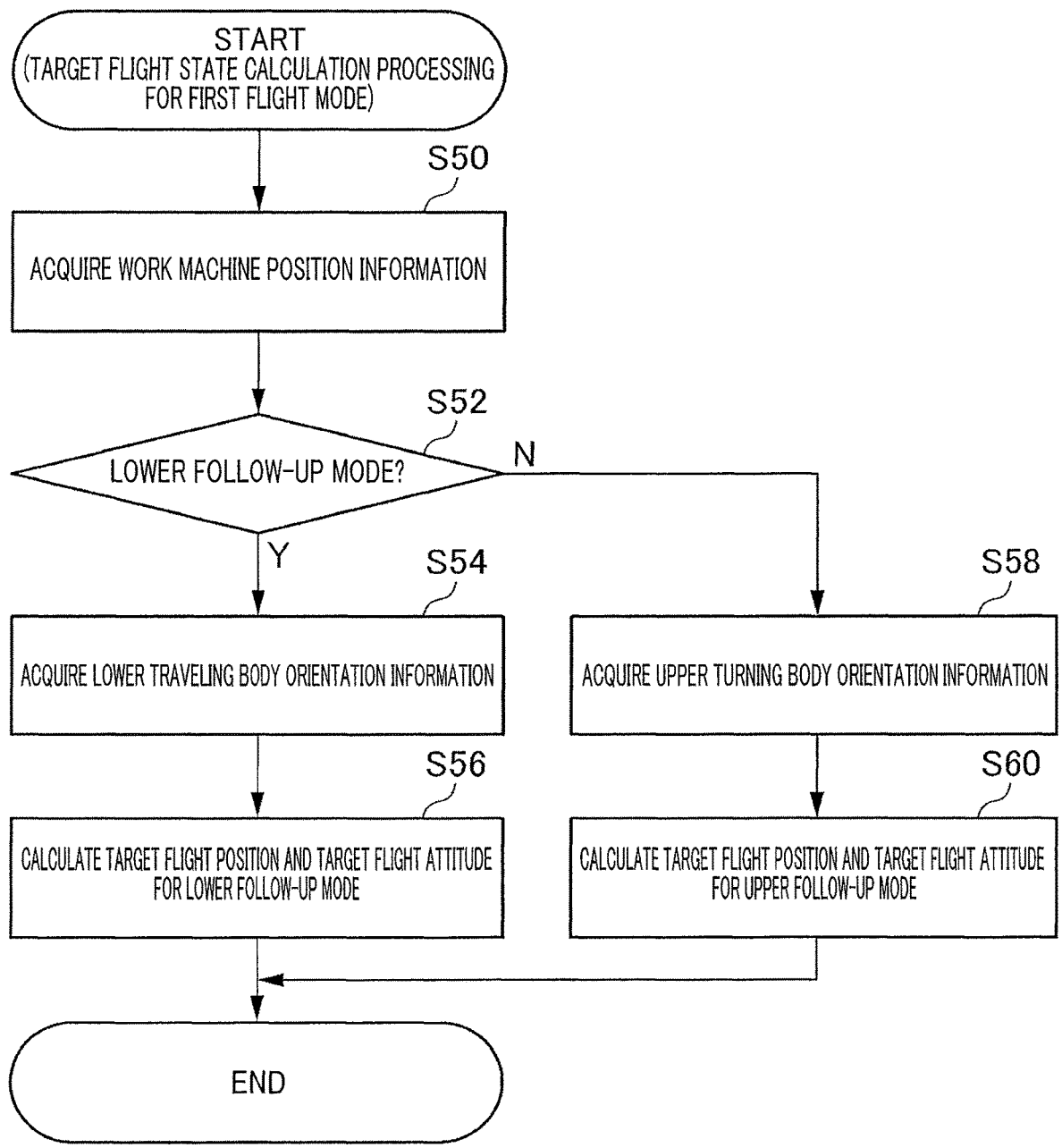
FIG. 14 is a flowchart showing a processing of calculating the target flight position and the target flight attitude in the first flight mode.

FIG. 14 shows a specific content of the target flight state calculation processing for the first flight mode.

First, in step S50, the information acquisition unit 510 of the flight control device 50 acquires the work machine position information from the control device 10. The work machine position information is acquired by the position information acquisition unit 150 of the control device 10 as described above, and transmitted to the flight control device 50.

Next, in step S52, the flight control command unit 514 of the flight control device 50 judges whether or not the currently designated flight mode is the lower follow-up mode included in the first flight mode. When the designated flight mode is the lower follow-up mode (YES in step S52), the information acquisition unit 510 of the flight control device 50 acquires the lower traveling object orientation information from the control device 10 (step S54), and the flight control command unit 514 of the flight control device 50 calculates the target flight position and the target flight attitude for the lower follow-up mode based on the lower traveling object orientation information and the work machine position information which is acquired in step S50 (step S56). The lower traveling body orientation information is acquired by the orientation information acquisition unit 152 (the lower traveling body orientation calculation unit 1521) of the control device 10 as described above, and transmitted to the flight control device 50. The target flight position for the lower follow-up mode is as described above. As the target flight position, for example, determined is a position behind the lower traveling body 110 on the center axis L1 (see FIG. 5) of the lower traveling body 110 in a top view. In this case, the flight control command unit 514 determines the target flight attitude for the lower follow-up mode in accordance with the target flight position.

On the other hand, when the designated flight mode is not the lower follow-up mode (NO in step S52), that is, when the designated flight mode is the upper follow-up mode included in the first flight mode as well as the lower follow-up mode, the information acquisition unit 510 acquires the upper turning body orientation information from the control device 10 (step S58), and the flight control command unit 514 calculates the target flight position and the target flight attitude for the upper follow-up mode based on the upper turning body orientation information and the work machine position information which is acquired in step S50 (step S60). The upper turning body orientation information is acquired by the orientation information acquisition unit 152 (the upper turning body orientation calculation unit 1520) of the control device 10 as described above, and transmitted to the flight control device 50. The target flight position for the upper follow-up mode is also as described above. The target flight position is, for example, determined to a position behind the upper turning body 120 (or the position near the turning axis) on the center axis L0 of the upper follow-up mode in a top view (see FIG. 5). The flight control command unit 514 calculates the target flight attitude for the upper follow-up mode in accordance with the target flight position.

Such determination of the target flight position and the target flight attitude for the first flight mode allows the image capture device 410 to acquire the peripheral monitoring image that is a photographed image suitable for peripheral monitoring of the work machine 1, i.e., the frontward environment image containing the entire work machine 1 and the periphery thereof.

The present invention is not limited to the embodiments described above but permitted to be variously modified and changed within the scope described in the claims. It is also possible to combine all or a plurality of the constituent elements of the above-described embodiments with each other.

As described above, there is provided a work support apparatus capable of providing an image useful for an operator who uses the work machine to the operator. The work machine includes a lower traveling body, an upper turning body mounted on the lower traveling body, and a work device attached to the upper turning body to make a working motion. The work support apparatus, which provides a captured image for supporting work to be performed by the work machine, includes a flying object, an image capture device, a flight mode designation unit, and a flight control unit. The flying object is capable of flying over the air. The image capture device is mounted on the flying object and acquires the captured image. The flight mode designation unit designates a specific flight mode from among a plurality of flight modes set in advance for a flight action of the flying object. The flight control unit performs a flight control of making the flying object make a flight action corresponding to the flight mode designated by the flight mode designation unit. The plurality of flight modes include a first flight mode for allowing the image capture device to acquire a peripheral monitoring image for monitoring the periphery of the work machine as the captured image, and a second flight mode for allowing the image capture device to acquire a work support image for supporting work to be performed by the work device as the captured image.

According to the work support apparatus, the designation of the flight mode by the flight mode designation unit and the flight control by the flight control unit based on the designated flight mode allow the image capture device to acquire a captured image useful for performing work by use of the work machine. Specifically, when the flight mode designation unit designates the first flight mode, the flight control unit makes the flying object make a flight action corresponding to the first flight mode to thereby allow the image capture device to acquire the periphery monitoring image, which is a captured image suitable for monitoring the periphery of the work machine. On the other hand, when the flight mode designation unit designates the second flight mode, the flight control unit makes the flying object make a flight action corresponding to the second flight mode to thereby allow the image capture device to acquire the work support image, which is a captured image suitable for supporting work to be performed by the work device.

Specifically, the first flight mode is preferably a flight mode in which the flying object performs hovering at a position behind the work machine to allow the image capture device acquire an image containing the entire work machine as the peripheral monitoring image. The peripheral monitoring image acquired by the first flight mode, containing the entire work machine, is extremely useful for monitoring the periphery of the work machine.

On the other hand, the second flight mode is preferably a flight mode in which the flying object performs hovering at a position around a distal end of the work device to allow the image capture device to acquire an image containing the distal end of the work device and a work object as the work support image. The work support image acquired by the second flight mode, containing the distal end of the work device and the work object, is extremely useful for supporting work by use of the work device.

Preferably, the flight control unit is configured to execute a mode transition processing of making the flying object make such a flight action as to avoid contact or proximity of the flying object with the work machine when the flight mode designated by the flight mode designation unit is shifted between the first flight mode and the second flight mode. The mode transition processing enables the flight mode to be safely shifted.

Specifically, in the case where the first flight mode includes a lower reference mode in which the target flight position of the flying object is determined by use of the lower traveling body as a reference, it is preferable that the flight control unit is configured to executes, when the flight mode designated by the flight mode designation unit is shifted between the lower reference mode and the second flight mode, at least one of a processing of making the flying object fly based on a target flight position determined by use of the upper turning body as a reference and a processing of temporarily raising the flying object, as the mode transition processing. The processing allows the flying object to be prevented from contact or proximity with the upper turning body.

This application is based on Japanese Patent application No. 2020-165395 filed on Sep. 30, 2020 with Japanese patent Office, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A work support apparatus for providing a captured image for supporting work to be performed by a work machine that includes a lower traveling body, an upper turning body mounted on the lower traveling body and a work device attached to the upper turning body to make a work motion, the work support apparatus comprising:
  a flying object capable of flying over the sky;
  an image capture device that is mounted on the flying object and captures the captured image;
  a flight mode designation unit that designates a flight mode from among a plurality of flight modes set in advance for the flight action of the flying object; and
  a flight control unit that performs a flight control for making the flying object make a flight action corresponding to the flight mode designated by the flight mode designation unit,
  wherein the plurality of flight modes include a first flight mode for allowing the image capture device to acquire a peripheral monitoring image for monitoring the periphery of the work machine as the captured image, and a second flight mode for allowing the image capture device to acquire a work support image for supporting work to be performed by the work device as the captured image,
  the flight control unit is configured to execute a mode transition processing of making the flying object make a flight action to avoid contact or proximity of the flying object with the work machine when the flight mode designated by the flight mode designation unit is shifted between the first flight mode and the second flight mode,
  the first flight mode includes a lower reference mode in which a target flight position of the flying object is determined by use of the lower traveling body as a reference, and the flight control unit is configured to perform a processing of making the flying object fly based on a target flight position determined by use of the upper turning body as a reference, as the mode transition processing, when the flight mode designated by the flight mode designation unit is shifted between the lower reference mode and the second flight mode.

2. The work support apparatus according to claim 1, wherein the first flight mode is a flight mode in which the flying object performs hovering at a position behind the work machine to allow the image capture device acquire an image containing the entire work machine as the peripheral monitoring image.

3. The work support apparatus according to claim 1, wherein the second flight mode is a flight mode in which the flying object performs hovering at a position around a distal end of the work device to allow the image capture device to acquire an image containing the distal end of the work device and a work object as the work support image.

4. The work support apparatus according to claim 1, wherein the mode transition processing is a process to make the flying object make a flying action based on the target flight position determined by use of the upper turning body as a reference so that a relative positional relationship of the flying object to the upper turning body is maintained in a target relative positional relationship or maintained within a predetermined target range.

5. A work support apparatus for providing a captured image for supporting work to be performed by a work machine that includes a lower traveling body, an upper turning body mounted on the lower traveling body and a work device attached to the upper turning body to make a work motion, the work support apparatus comprising:

a flying object capable of flying over the sky;

an image capture device that is mounted on the flying object and captures the captured image;

a flight mode designation unit that designates a flight mode from among a plurality of flight modes set in advance for the flight action of the flying object; and a flight control unit that performs a flight control for making the flying object make a flight action corresponding to the flight mode designated by the flight mode designation unit, wherein the plurality of flight modes include a first flight mode for allowing the image capture device of the flying object to acquire a peripheral monitoring image for monitoring the periphery of the work machine as the captured image with the flying object being spaced from the work machine, and a second flight mode for allowing the image capture device of the flying object to acquire a work support image for supporting work to be performed by the work device as the captured image with the flying object being spaced from the work machine, the flight control unit is configured to execute a mode transition processing of making the flying object make a flight action to avoid contact or proximity of the flying object with the work machine when the flight mode designated by the flight mode designation unit is shifted between the first flight mode and the second flight mode, the first flight mode includes a lower reference mode in which a target flight position of the flying object is determined by use of the lower traveling body as a reference, and the flight control unit is configured to perform a processing of temporarily raising the flying object, as the mode transition processing, when the flight mode designated by the flight mode designation unit is shifted between the lower reference mode and the second flight mode.

6. The work support apparatus according to claim 5, wherein the first flight mode is a flight mode in which the flying object performs hovering at a position behind the work machine to allow the image capture device acquire an image containing the entire work machine as the peripheral monitoring image.

7. The work support apparatus according to claim 5, wherein the second flight mode is a flight mode in which the flying object performs hovering at a position around a distal end of the work device to allow the image capture device to acquire an image containing the distal end of the work device and a work object as the work support image.

* * * * *